US008452256B2

(12) United States Patent
Tazaki

(10) Patent No.: US 8,452,256 B2
(45) Date of Patent: May 28, 2013

(54) MOBILE TERMINAL SEARCH IN A COMMUNICATION SYSTEM

(75) Inventor: Yuji Tazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 839 days.

(21) Appl. No.: 12/634,315

(22) Filed: Dec. 9, 2009

(65) Prior Publication Data

US 2010/0087168 A1  Apr. 8, 2010

Related U.S. Application Data

(63) Continuation of application No. PCT/JP2007/000640, filed on Jun. 15, 2007.

(51) Int. Cl.
*H04L 12/46* (2006.01)

(52) U.S. Cl.
USPC ............... 455/404.2; 455/411; 455/414.1; 455/425; 455/428; 455/435.1

(58) Field of Classification Search
USPC .............. 455/404.2, 411, 414.1, 425, 428, 455/435.1, 445, 458; 370/328, 329, 321, 370/338, 401
See application file for complete search history.

(56) References Cited

U.S. PATENT DOCUMENTS

| 5,749,053 | A | 5/1998 | Kusaki et al. | |
|---|---|---|---|---|
| 7,640,008 | B2 * | 12/2009 | Gallagher et al. | 455/414.1 |
| 7,920,521 | B2 * | 4/2011 | Xiang et al. | 370/331 |
| 7,949,326 | B2 * | 5/2011 | Gallagher et al. | 455/404.2 |
| 8,180,351 | B2 * | 5/2012 | Stanforth | 455/445 |
| 8,219,117 | B2 * | 7/2012 | Altshuller et al. | 455/458 |
| 8,244,243 | B2 * | 8/2012 | Okuda | 455/435.1 |
| 2005/0186948 | A1 * | 8/2005 | Gallagher et al. | 455/414.1 |
| 2007/0202871 | A1 * | 8/2007 | Altshuller et al. | 455/428 |
| 2008/0084842 | A1 * | 4/2008 | Xiang et al. | 370/329 |
| 2008/0253322 | A1 * | 10/2008 | So et al. | 370/329 |
| 2008/0259889 | A1 * | 10/2008 | Wu | 370/338 |
| 2009/0054070 | A1 * | 2/2009 | Gallagher et al. | 455/445 |
| 2010/0087168 | A1 * | 4/2010 | Tazaki | 455/411 |
| 2011/0171957 | A1 * | 7/2011 | Okuda | 455/435.1 |
| 2011/0182243 | A1 * | 7/2011 | Gallagher et al. | 370/328 |

(Continued)

FOREIGN PATENT DOCUMENTS

| EP | 2159970 A1 * | 3/2010 |
|---|---|---|
| JP | 08065728 | 3/1996 |

(Continued)

OTHER PUBLICATIONS

International Search Report dated Sep. 18, 2007.

(Continued)

*Primary Examiner* — William D Cumming
(74) *Attorney, Agent, or Firm* — Smith, Gambrell & Russell, LLP

(57) ABSTRACT

A communication system includes: a base station device that performs wireless communication with a mobile terminal; a gateway device that is connected to the base station device and provides the mobile terminal via the base station device with a connection path to a network; an authentication server that is connected to the gateway device and issues an authentication key to the mobile terminal via the gateway device and the base station device; and a position search server which outputs a request requesting determination of position of the mobile terminal, wherein, the authentication server identifies the authentication unit from the first registration table, and outputs the request to the identified authentication unit, the authentication unit identifies the data path unit or paging controller unit from the second registration table, and the position search server obtains position information of the mobile terminal from the identified data path unit or paging controller unit.

15 Claims, 22 Drawing Sheets

U.S. PATENT DOCUMENTS

| | | | | |
|---|---|---|---|---|
| 2011/0216735 A1* | 9/2011 | Venkatachalam et al. | .... | 370/331 |
| 2011/0286465 A1* | 11/2011 | Koodli et al. | ......... | 370/401 |
| 2012/0129517 A1* | 5/2012 | Fox et al. | ......... | 455/425 |

FOREIGN PATENT DOCUMENTS

| | | |
|---|---|---|
| JP | 09065417 | 3/1997 |
| JP | 09172683 | 6/1997 |
| JP | 2003319436 | 11/2003 |
| JP | 2006279632 | 10/2006 |

OTHER PUBLICATIONS

IEEE Standard for Local and metropolitan area networks Part 16: Air Interface for Fixed and Mobile Broadband Wireless Access Systems Amendment 2: Physical and Medium Access Control Layers for Combined Fixed and Mobile Operation in Licensed Bands and Corrigendum 1 IEEE Computer Society and the IEEE Microwave Theory and Techniques Society IEEE Std 802.16e-2005 and IEEE Std 802.16/2004/Cor1-2005 Feb. 28, 2006.

3GPP TS 23.060 V4.7.0 (Dec. 2002) 3rd Generation Partnership Project; Technical Specification Group Services and System Aspects; General Packet Radio Service (GPRS); Service description; Stage 2 (Release 4).

WiMAX Forum Network Architecture Release 1.0.0 dated Mar. 28, 2007.

* cited by examiner

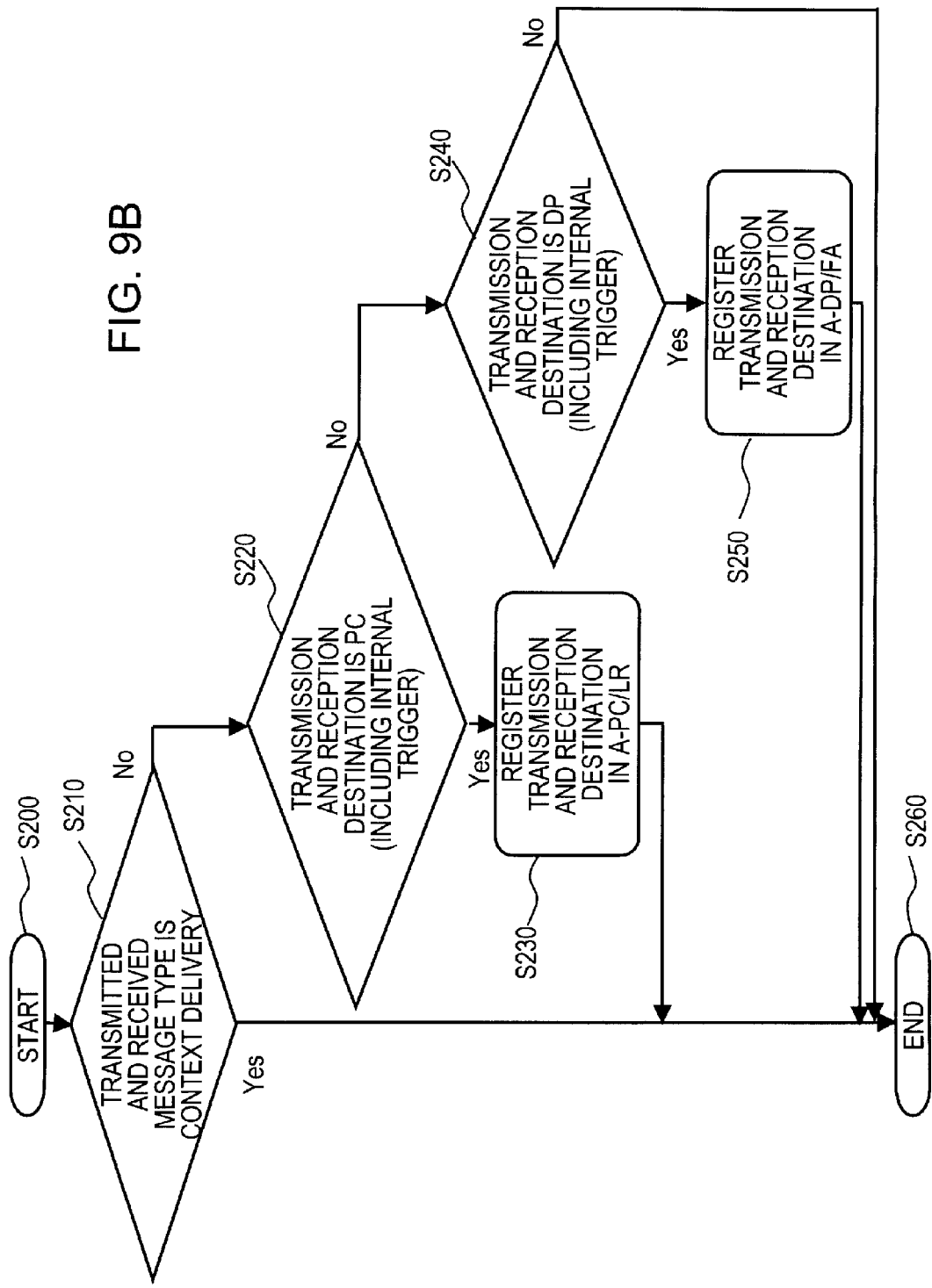

FIG. 10A

| MS ID | Last Reported/Report Authenticator ~631 |
|---|---|
| 01-23-45-67-89-0A | 10.10.23.5 |
| 01-23-BE-67-89-0B | 10.10.33.11 |
| 01-43-55-67-89-0A | 137.100.102.12 |
| 11-23-98-67-89-0A | 164.100.68.3 |

FIG. 10B

| MS ID | Last Reported/Report A-PC/LR | Last Reported/Report A-DP ~4131 |
|---|---|---|
| 01-23-45-67-89-0A | 10.10.23.12 | 16.10.23.8 |
| 23-BE-45-67-11-0B | 10.10.33.11 | 120.10.33.12 |
| 45-67-45-57-89-0A | 147.100.102.12 | 111.10.112.5 |
| 01-13-45-67-89-0A | 184.100.68.3 | 124.10.68.3 |

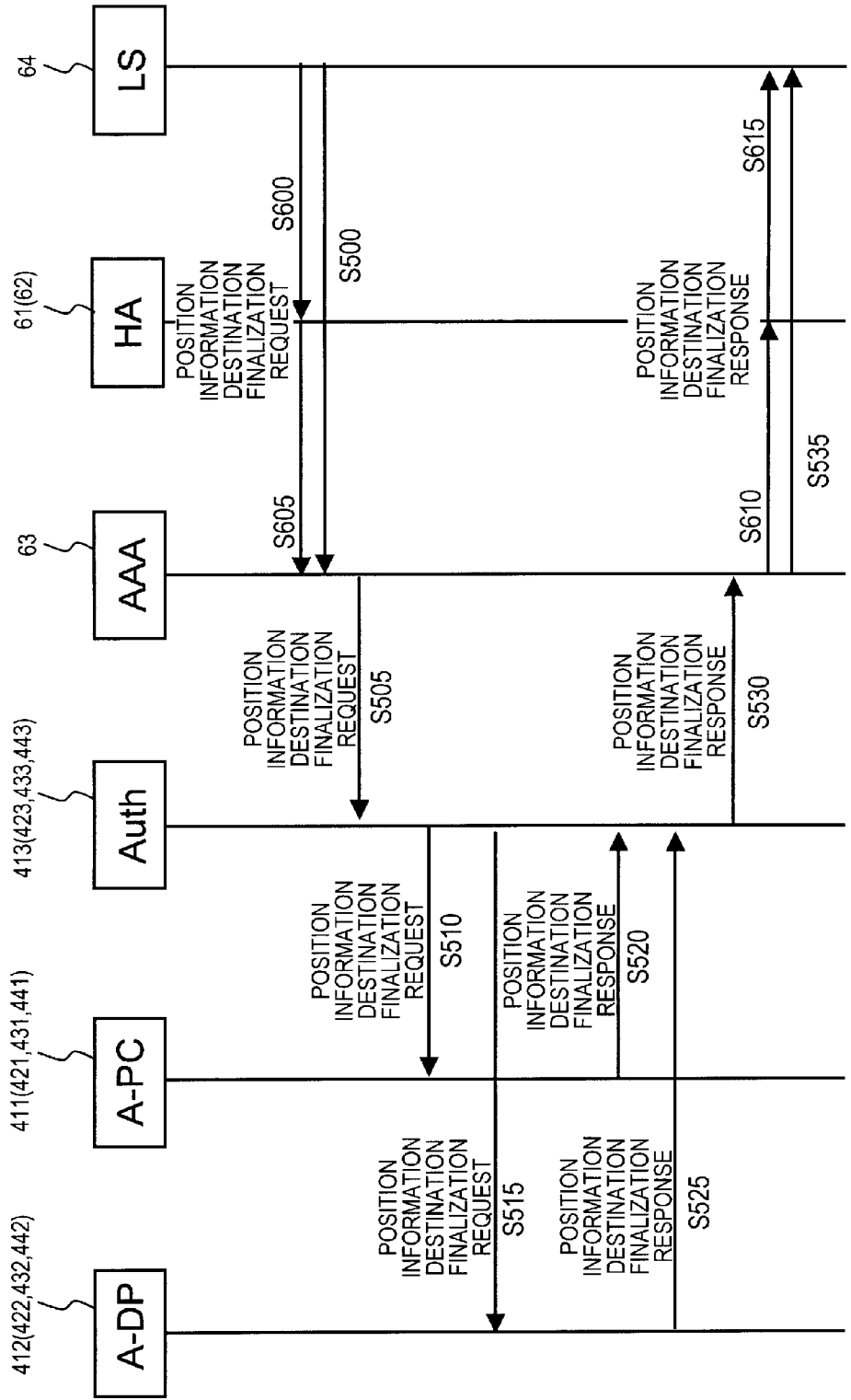

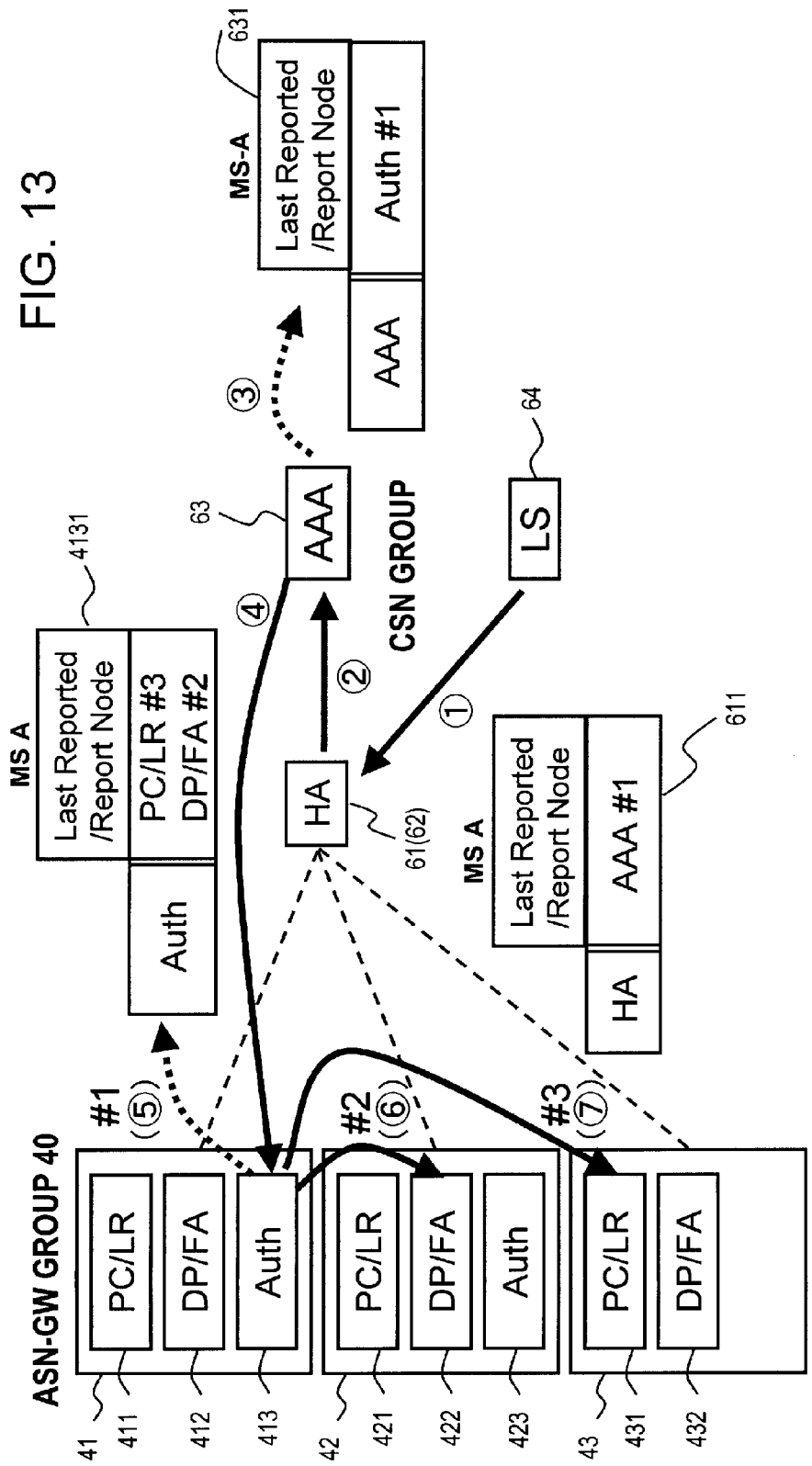

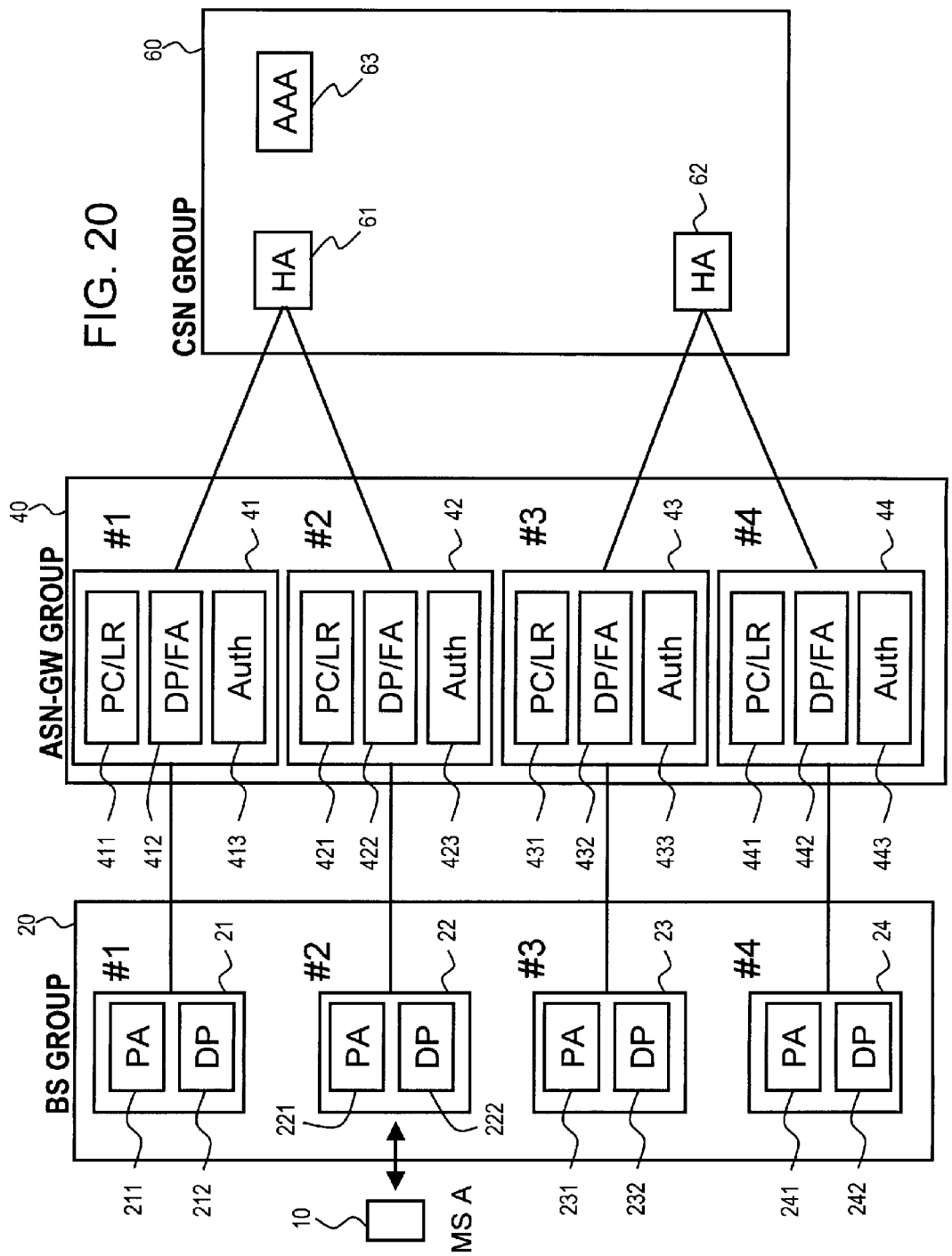

MOBILE TERMINAL SEARCH IN A COMMUNICATION SYSTEM

CROSS-REFERENCE TO RELATED APPLICATION

This application is a continuation of international application PCT/JP2007/000640, filed on Jun. 15, 2007.

FIELD

The present invention relates to a communication system, a mobile terminal position search method in a communication system, and a program.

BACKGROUND

At present, there are "WiMAX" (see for example Non-patent Reference 1 below) and "3GPP" (see for example Non-patent Reference 2 below) as communication standards for portable telephones and other mobile terminals.

FIG. 20 depicts an example of the configuration of a communication system 100 of WiMAX (see for example Non-patent Reference 3 below). The communication system 100 includes a MS-A (Mobile Station-A) 10, BS group 20, ASN-GW group 40, and CSN group 60.

The BS group 20 includes a plurality of BS (Base Station, BS#1 to #4) 21 to 24; the CSN-GW group 40 also includes a plurality of ASN-GW (Access Service Network-GateWay, ASN-GW#1 to #4) 41 to 44.

The ASN-GW 41 to 44 are gateways to provide the MS-A 10 with access to the network (including the ASN group 40 and CSN group 60). The CSN group 60 includes a device to provide service to the MS-A 10, which may for example be equivalent to a service provider or similar. FIG. 19 depicts an example includes four BS 21 to 24 and four ASN-GW 41 to 44.

Each of the BS 21 to 24 includes two entities (function blocks) which are PA (Paging Agent) 211, 221, 231, 241, and DP (Data Path) 212, 222, 232, 242.

The PA 211, 221, 231, 241 handle conversation between the PC (Paging Controller) 411, 421, 431, 441 of the ASN-GW 41 to 44 and IEEE 802.16e.

The DP 212, 222, 232, 242 (also called transmission portion) perform selection of input data packets and similar, and transmission of data to the MS-A 10 and similar.

On the other hand, each of the ASN-GW 41 to 44 also includes PC/LR (Location Register) 411, 421, 431, 441, DP/FA (Foreign Agent) 412, 422, 432, 442, and Auth (Authenticator) 413, 423, 433, 443.

The PC/LR 411, 421, 431, 441 strictly speaking include two entities, the PC and LR, but are executed as a single block when executing various operations, and so are depicted as single entity in the drawing. Similar remarks apply to the DP/FA 412, 422, 432, 442 (also called communication portion).

The PC is an entity which manages operation of the MS-A 10 in idle mode (the state in which the power supply to the MS-A 10 is turned off), and the LR is a distributed database having information related to the MS in idle mode. The FA is a router, positioned in a Foreign Network of the MS-A 10, which notifies the HA 61, 62 of the position of the MS-A 10 and relays and transfers data of the MS-A 10.

The Auth 413, 423, 433, 443 provide links with the MS-A 10 and an AAA server 63 at the time of authentication, and operate as client of the AAA server 63. The Auth 413, 423, 433, 443 hold information relating to authentication and perform key management (holding authentication key issued by the AAA server 63 and similar), and for example transmit authentication keys to MS-A 10 via the BS 21 to 24.

The CSN group 60 includes HA (Home Agent) 61 and 62 and the AAA (Authentication, Authorization, and Accounting) server 63.

The HA 61, 62 are routers, positioned in a Home Network of the MS-A 10, which ascertain the network in which the MS-A 10 is positioned and deliver data to the MS-A 10.

The AAA server 63 is a server which performs authentication of the MS-A 10 and similar, and for example holds authentication keys for each MS and outputs the authentication key to the MS-A 10 for which there has been a connection request.

As depicted in FIG. 20, the HA 61 is connected to the ASN-GW 41 and 42, and the ASN-GW 41 and 42 are respectively connected to the BS 21 and 22. Further, the HA 62 is connected to the ASN-GW 43 and 44, and the ASN-GW 43 and 44 are respectively connected to the BS 23 and 24.

The communication system 100 configured in this way operates as follows (see for example Non-patent Reference 3 below). First, when the MS-A 10 initially connects to the network (Initial Network Entry), the DP 222 of the BS 22, DP/FA 422 of the ASN-GW 42, HA 61 of the CSN group 60, and AAA server 63 operate, based on a connection request of the MS-A 10, and identification information for each MS-A 10 such as an IP address of the MS-A 10 is held. Then, data from the network is transmitted from the HA 61, via the DP/FA 422 and DP 222, to the MS-A 10.

Thereafter, the MS-A 10, as the active state, transmits and receives data via the BS 22 with the network.

Then, when the MS-A 10 moves into the cell range of the BS 23 and the power supply of the MS-A 10 is cut off, the MS-A 10 transmits and receives message with the PC/LR 431 of the ASN-GW 43 via the BS 23. Hence when in the idle state, the PC/LR 431 is active, and the PC/LR 431 holds identification information for the MS-A 10.

Non-patent Reference 1: IEEE 802.16e-2005
Non-patent Reference 2: 3GPP TS 23.060 V4.7.0 (2002-12)
Non-Patent Reference 3: WiMAX Forum Network Architecture Release 1.0.0, Mar. 28, 2007

Focusing on the ASN-GW group 40 in the above-described example, the operating entities are different according to the state of the MS-A 10. That is, when the MS-A 10 is in the active state, for example the DP/FA 422 of the ASN-GW 42 and Auth 423 operate, and when in the idle state, for example the PC/LR 431 of the ASN-GW 43 operates. And, connections of these entities 422 and similar with the MS-A 10 are currently established, the ID of the MS-A 10 is held, and service is provided.

In a certain time period, the entity 411 or similar of one among the ASN-GW 41 to 44 operates, and which entity 411 or similar operates changes according to the state of the MS-A 10 and similar.

In this state, when an attempt is made to search for the current position of the MS-A 10, for the operating entity 411 and similar is searched, all of the entities 411 and similar of all of the ASN-GW 41 to 44 in the ASN-GW group 40 must be searched. As a result, a resource of the communication system 100 is spent merely on searching. Moreover, when all of the entities 411 and similar are searched, an extremely long time is spent on searching, and such a method is not effective for providing service which includes search.

On the other hand, an entity called an HLR (Home Location Register) performs centralized management of the MS-A 10 in a 3GPP communication system, as also disclosed in the above-described Non-patent Reference 2. Hence in 3GPP, in order to search the current position of the MS-A 10, it is sufficient to access the HLR and perform a search.

In WiMAX, there is no entity which performs centralized management of the current positions of the MS-A 10 as in 3GPP, and so in order to search for the current position of the MS-A 10, a communication system in which resources are utilized effectively, and search times can be shortened, is desirable.

SUMMARY

According to an aspect of the invention, a communication system includes: a base station device that performs wireless communication with a mobile terminal; a gateway device that is connected to the base station device and provides the mobile terminal via the base station device with a connection path to a network, and including a data path unit that selects input data and transmits the data to the mobile terminal, a paging controller unit that manages information of the mobile terminal in a state in which power supply of the mobile terminal is turned off, and an authentication unit that transmits the authentication key issued by the authentication server to the mobile terminal, and includes a second registration table which registers identification information of the data path unit or the paging controller unit finally performed data transmission and reception, wherein either the data path unit or the paging controller unit operates according to the state of the mobile terminal; an authentication server that is connected to the gateway device and issues an authentication key to the mobile terminal via the gateway device and the base station device, and including a first registration table which registers identification information of the authentication unit finally performed data transmission and reception; and a position search server which outputs a request requesting determination of position of the mobile terminal; wherein, the authentication server identifies the authentication unit from the first registration table, and outputs the request to the identified authentication unit, if the authentication server receives the request from the position search server, the authentication unit identifies the data path unit or the paging controller unit from the second registration table, if the authentication unit receives the request from the authentication server, and the position search server obtains position information of the mobile terminal from the identified data path unit or paging controller unit.

BRIEF DESCRIPTION OF THE DRAWINGS

FIG. 9A and FIG. 9B are flowcharts depicting examples of registration processing;

FIG. 10A and FIG. 10B are examples of registration tables;

FIG. 12 depicts an example of a sequence of position search processing;

FIG. 13 depicts the flow of processing when performing position searching;

FIG. 20 depicts an example of the configuration of a communication system of the prior art.

BEST MODE FOR CARRYING OUT THE INVENTION

Best mode for carrying out the present invention will now be explained below.

1. First Embodiment

Figure 1:
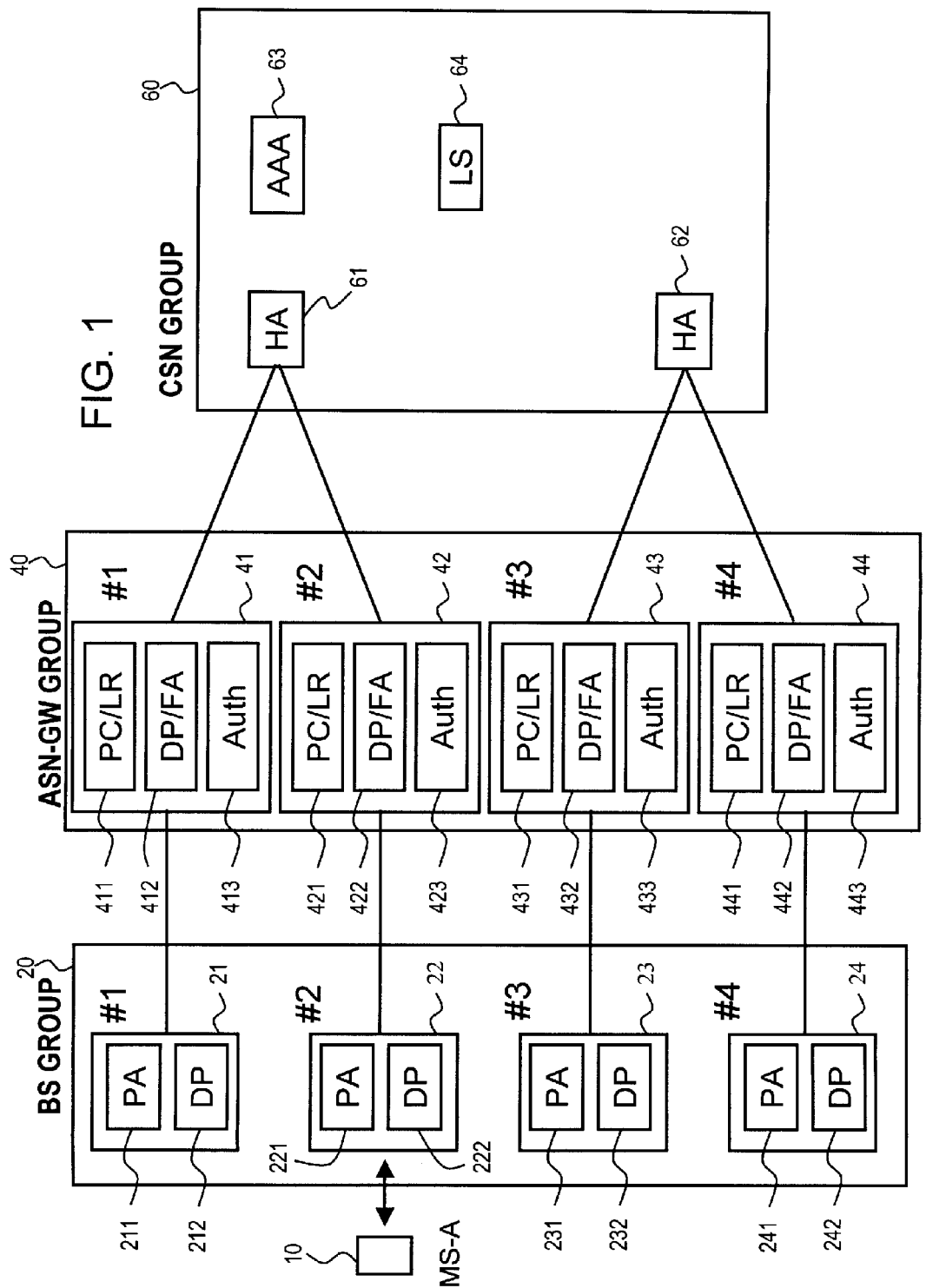
FIG. 1 depicts an example of the configuration of a communication system.

A first embodiment is explained. FIG. 1 depicts an example of the configuration of a communication system 1 of the first embodiment. As compared with the communication system 100 of the prior art depicted in FIG. 20, a LS (Location Server) 64 is added to the CSN group 60. In the embodiments described below, including the first embodiment, request (or instruction) is issued from the LS 64 if position search processing is performed. That is, the LS 64 is a position search server including function enabling searching for the position of the MS-A 10 and other devices intensively. Otherwise the configuration is substantially the same as in FIG. 20 described above, and so a detailed explanation is omitted. This communication system 1 is a communication system based on the so-called "WiMAX" standard described above.

Figure 2:
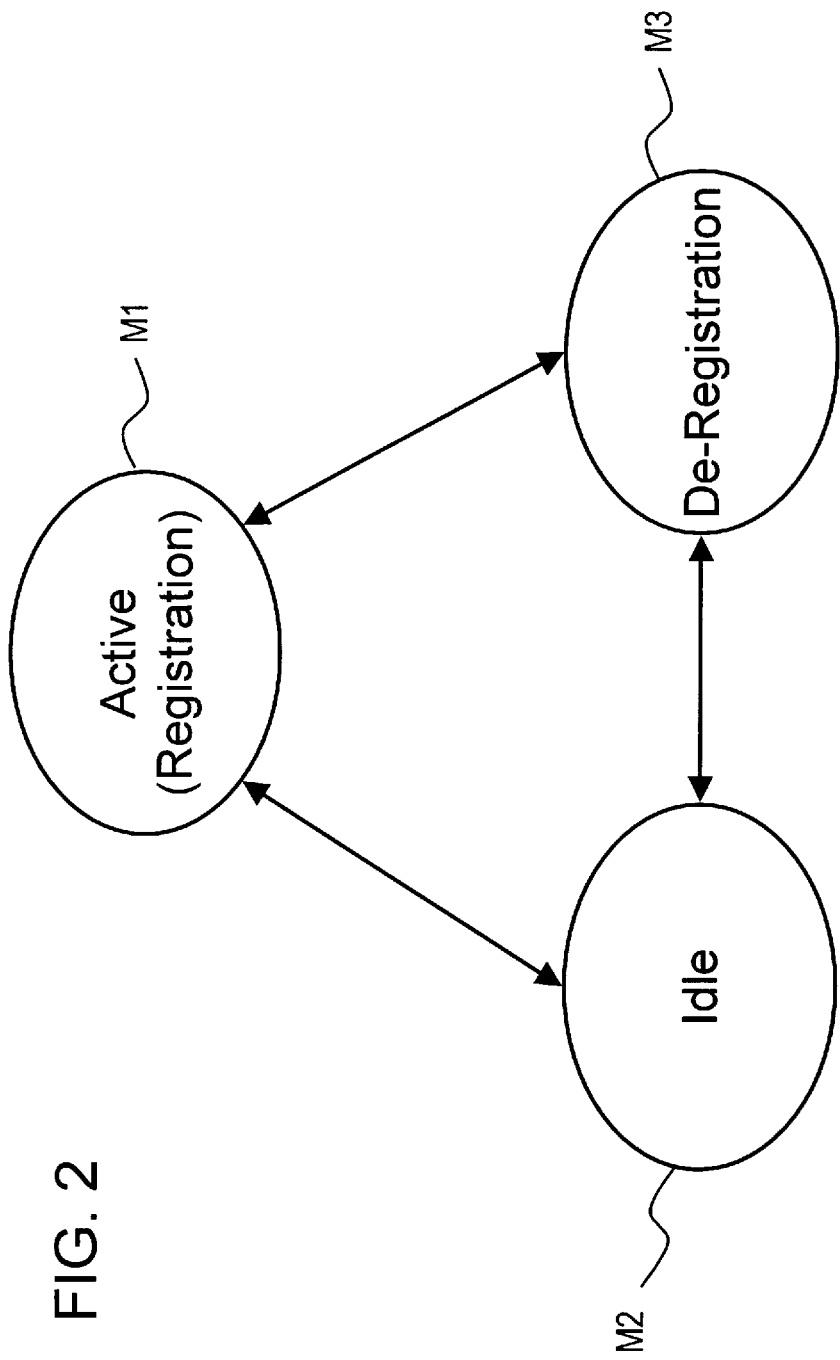
FIG. 2 depicts an example of the state of a mobile terminal.

FIG. 2 depicts an example of state transition of the MS-A (mobile terminal A) 10. This is a state transition of the MS-A 10 from the network side (the BS group 20 and ASN-GW group 40). States of the MS-A 10 include an active state M1, an idle state M2, and a de-registration state M3.

The active state M1 is a state in which the MS-A 10 is receiving service, and includes processing for registration with the network. The idle state M2 is a state in which the power to the MS-A 10 is turned off, and the deregistration state M3 is a state in which registration with the network is shut off. The MS-A 10 makes transitions between these three states M1 to M3.

Figure 3:
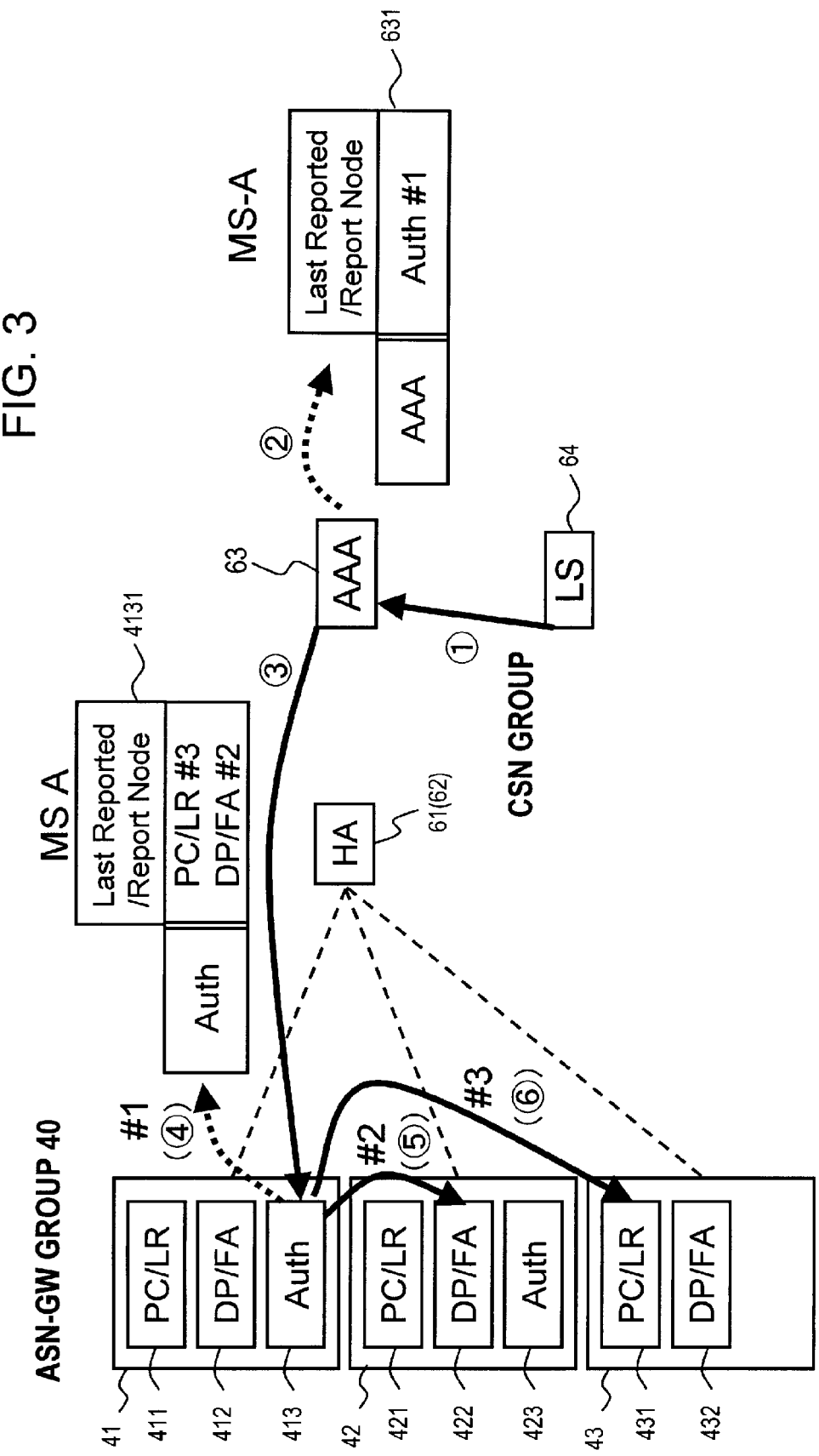
FIG. 3 depicts the flow of processing when performing position searching.

FIG. 3 is used to explain the flow of position search processing in the communication system 1. Position search processing is explained referring to the figure.

First, the LS 64 outputs a message indicating a request for position search processing (or a position information destination final determination request) to the AAA server 63.

Next, the AAA server 63 searches, on the basis of the massage or similar, Auth 413, 423, which is registered in advance in a registration table 631, and performed transmission and reception of the message or similar finally (reported finally). The detail of this registration processing is described below. For example, the AAA server 63 reads Auth (#1) 413 from the registration table 631.

Then, the AAA server 63 outputs a position information destination final determination request message to the Auth 413.

Upon receiving this message, the Auth 413 searches PC/LR 411, 421, 431 (in the example depicted in the figure, the PC/LR (#3) 431) and DP/FA 412, 422, 432 (in the example depicted in the figure, the DP/FA (#2) 422), registered in advance in a registration table 4131.

There are the two types of the PC/LR 411, 421, 431, and DP/FA 412, 422, 432 as the last reported entities in the registration table 4131 of the Auth 413. The reason why there are two types is because the operating entity is different according to the state of the MS-A 10 (FIG. 2). That is, as explained with respect to the background art, when the MS-A 10 is in the active state the DP/FA 412, 422, 432 operate, and when in the idle state the PC/LR 411, 421, 431 operate. Hence, two types of entity are registered in the registration table 4131, and are the DP/FA 412, 422, 432 which notified finally in the active state and the PC/LR 411, 421, 431 which notified finally in the idle state.

Returning to FIG. 3, the Auth 413 outputs, to the PC/LR (#3) 431 and DP/FA (#2) 422 which are registered in the registration table 4131, a request (position information destination final determination request) to finalize which truly received the final notification. Upon receiving this request, the PC/LR (#3) 431 and DP/FA (#2) 422 output response indicating whether the entity themselves truly received the final notification, to the Auth 413.

The Auth 413 outputs to the AAA server 63 a response (position information destination final determination response) indicating the information obtained (either the PC/LR (#3) 431 or DP/FA (#2) 422). The AAA server 63 outputs this response to the LS 64.

The LS 64 obtains information on the PC/LR 431 or DP/FA 422 which notified finally. The LS 64 can obtain information on the final notification, that is, information regarding to the PC/LR 431 or DP/FA 422 which is currently managing the MS-A 10. And, the LS 64 obtains position information of the MS-A 10 (latitude, longitude, altitude, and similar), by outputting a request message to acquire position information of the MA-A 10 to the PC/LR 431 or DP/FA 422 currently managing the MS-A 10 (or, by performing transmission and reception of message to establish a connection with the MS-A 10). Upon acquisition of position information, the position search operation ends.

The PC/LR 431 or DP/FA 422 notified finally is the PC/LR 431 or DP/FA 422 currently managing the MS-A 10, for the following reason. This is because as explained above, the state of the MS-A 10 changes according to the current state (FIG. 2), and the entity 411 of ASN-GW 41 to 44 or similar responding to the MS-A 10 is different according to the state, and moreover the PC/LR 411, 421, 431, 441 or PD/FA 412, 422, 432, 442 which notified finally to the Auth 413, 423, 433, 443 is recorded in the registration table 4131 held by the Auth 413, 423, 433, 443, but so long as there is no special event within the communication system 1, this state is held and the ASN-GW 41 to 44 operate, and the content registered in the registration table 4131 indicates the entity 411 or similar which currently manages (provides service to) the MS-A 10.

This processing assumes that the AAA server 63 holds identification information for the Auth 413, 423, 433, 443 which performed final transmission and reception of the message (the registration table 631), and that the Auth 413, 423, 433, 443 ascertain transmission and reception destination by holding identification information for each of the PC/LR 411, 421, 431, 441 and DP/FA 412, 422, 432, 443 which performed final transmission and reception of the message (the registration table 4131). These information can be obtained through transmission and reception of the message during various events.

In searching for the position of the MS-A 10, the entity 411 or similar are identified within the ASN-GW 41 to 44 through three processes which are searching using the registration table 4131 in the Auth 413, 423, 433, 443, and, on the basis of this, accessing the DP/FA 422 and accessing the PC/LR 431. Thereafter, by obtaining position information for the MS-A 10 from the relevant PC/LR 431 or DP/FA 422, the position of the MS-A 10 can easily be searched.

Thus in the first embodiment, within the ASN-GW 41 to 44, the entity 411 or similar can always be identified through three search processes, regardless of the number of ASN-GW 41 to 44. Hence compared with a case in which all the entities 411 or similar of the ASN-GW 41 to 44 are searched, the position of the MS-A 10 can be searched quickly. To the extent that the search can be performed quickly, resource of the communication system 1 can be used for other processing, so that resource can be utilized effectively.

Next, registration processing of two registration tables 631 and 4131 is explained, and in addition the timing of execution of this registration processing and related events are also explained. Then, detail of processing to search for the position of the MS-A 10 based on the registered registration tables 631 and 4131 is explained.

1.1 Registration Processing

As depicted in FIG. 3, there are two registration tables 631 and 4131 in the communication system 1. Registration processing in each of the registration tables 631 and 4131 is explained.

FIG. 4 to FIG. 8 depict examples of sequences of events executed by registration processing; FIG. 9A depicts a flowchart of registration processing in the AAA server 63, and FIG. 9B depicts a flowchart of registration processing in the Auth 413, 423, 433, 443.

First, registration processing in the AAA server 63 is explained. This registration processing is executed for two events, which are the initial network registration event depicted in FIG. 4, and the re-authentication event depicted in FIG. 5. This is because these two events indicate that the AAA server 63 performs transmission and reception of message with the Auth 413, 423, 433, 443, and finally transmits and receives with one of the Auth 413, 423, 433, 443 among the Auth 413, 423, 433, 443. This is because the AAA server 63 is a server which manages authentication of the MS-A 10, and once initial authentication and re-authentication is performed, the communication system 1 operates with this state maintained, without any communication in particular with the Auth 413, 423, 433, 443. Hence the Auth 413, 423, 433, 443 performed finally transmission and reception of message is the Auth 413, 423, 433, 443 which currently manages the MS-A 10 (which provides service to the MS-A 10).

Figure 4:
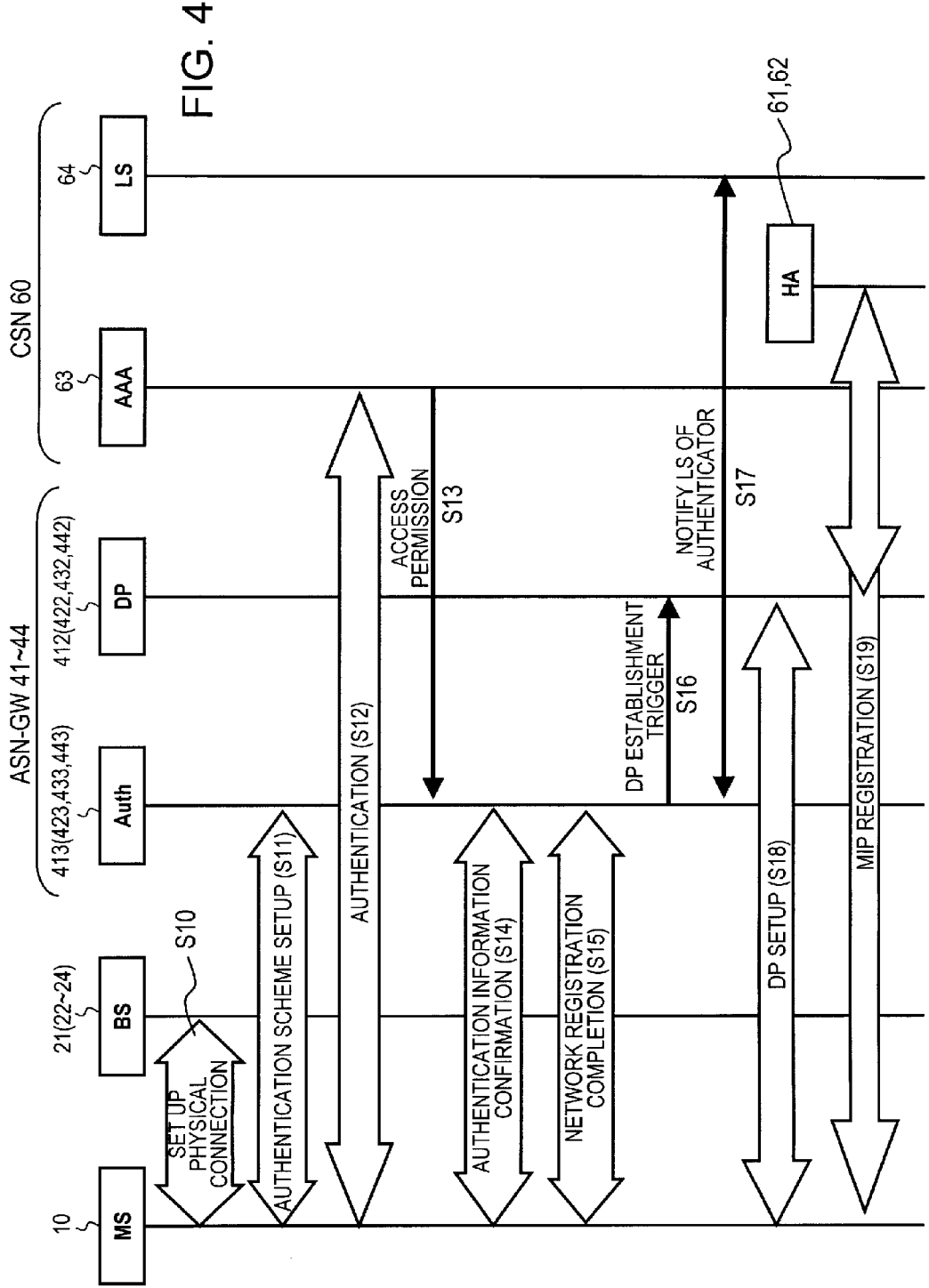
FIG. 4 depicts an example of a sequence of initial network registration processing.
Figure 5:
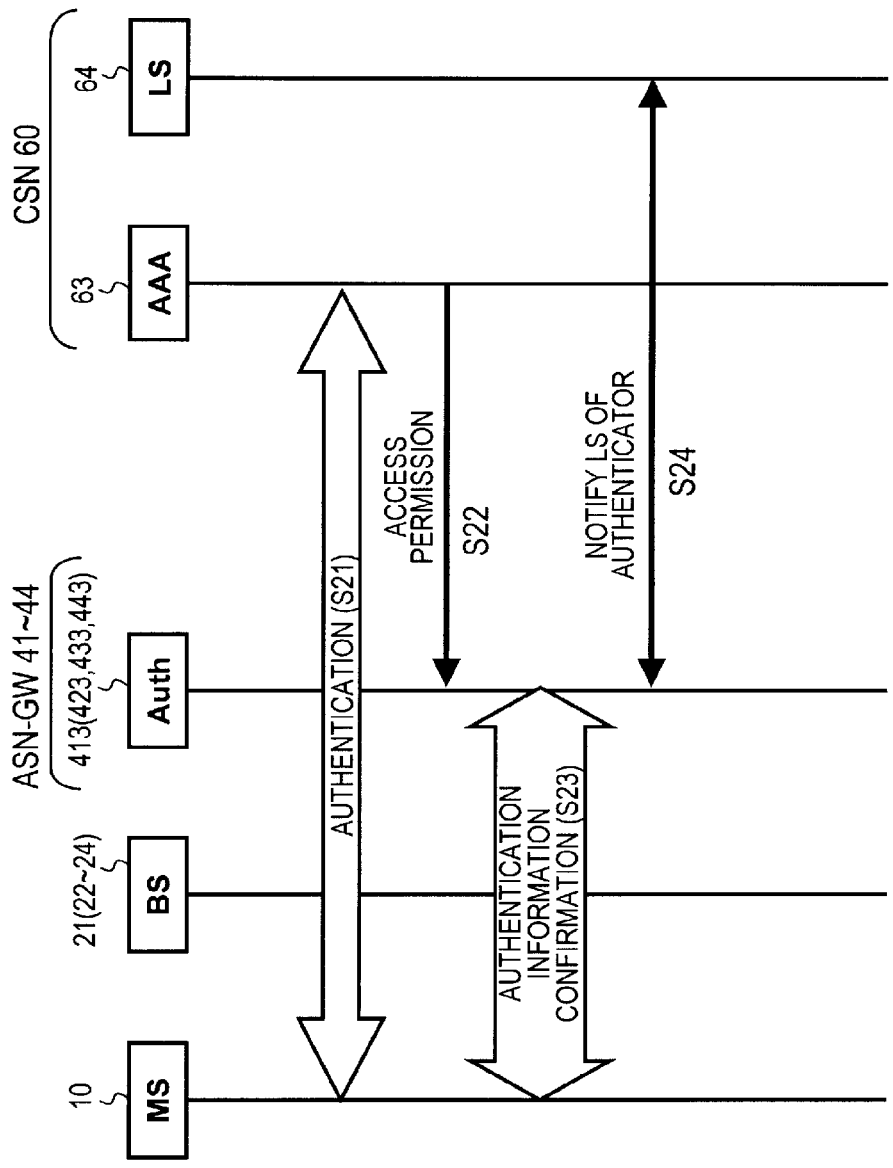
FIG. 5 depicts an example of a sequence of re-authentication processing.

FIG. 4 and FIG. 5 are explained more specifically. As depicted in FIG. 4, in the initial network registration event, the MS-A 10 sets up the physical connection with one of the BS 21 to 24 (S10). For example, transmission and reception of channel parameter, and transmission and reception of initial ranging message are performed.

Next, the MS-A 10 sets up an authentication scheme, via the BS 21 to 24, with one of the Auth 413, 423, 433, 443 of the ASN-GW 41 to 44 (S11). For example, the authentication policy by an SBC message is transmitted and received, various parameters for authentication by a PKM message are transmitted and received, and similar.

Next, the MS-A 10 performs authentication processing with the AAA server 63 (S12). In the processing of the previous stages (S10, S11), or in this processing, the Auth 413, 423, 433, 443 obtains identification information of the MS-A 10 (for example, the IP address) from the MS-A 10. And, in this authentication processing, the Auth 413, 423, 433, 443 outputs to the AAA server 63 the obtained identification information of the MS-A 10, as well as its own identification information (for the Auth 413, 423, 433, 434). By this means, the AAA server 63 can register identification information of "Auth#1" in the registration table 631 as depicted in FIG. 3.

When authentication processing ends, the AAA server 63 outputs access permission message of the MS-A 10 to the Auth 413, 423, 433, 443 (S13). In this embodiment, on the occasion of transmission of this message, processing for registration in the registration table 631 is performed. As explained above, registration is performed with this timing because in subsequent processing the AAA server 63 does not transmit or receive messages or similar with other entities 413 or similar, and this state is maintained.

The registration processing depicted in FIG. 9A is explained. When registration processing is started (S100), the AAA server 63 judges whether the access permission message is output (S110). The access permission message is the message S13 in FIG. 4 described above.

When the access permission message is output (Yes in S110), the AAA server 63 registers identification information (ID) of the authentication permission destination Auth 413, 423, 433, 443 in the registration table 631 (S120). And, the AAA server 63 ends registration processing (S130).

On the other hand, when the access permission message does not output (No in S110), the AAA server 63 ends the series of processing without registration in the registration table 631 (S130).

FIG. 10A depicts an example of the registration table 631. A MS identification information for each MS, and an identification information for the Auth 413, 423, 433, 443 which finally performed transmission and reception with the MS, are registered.

Returning to FIG. 4, when the AAA server 63 outputs the access permission message (S13), processing to confirm authentication information is performed through message transmission and reception between the MS-A 10 and Auth 413, 423, 433, 443 (S14), and complete processing of network registration is performed (S15). Then, database setup processing (S18) and MS-A 10 registration processing (S19) are performed.

Processing by the AAA server 63 for registration in the registration table 631 is also performed at the time of the re-authentication event depicted in FIG. 5.

That is, the MS-A 10 performs authentication processing with the AAA server 63 via the BS 21 to 24 and the Auth 413, 423, 433, 443 (S21) every each fixed period. The AAA server 63 outputs to the Auth 413, 423, 433, 443 the access permission message for the network (the BS group 20 and ASN-GW group 40 and similar) (S22). As with the initial network registration event, on the occasion of the output of this message, the AAA server 63 performs registration processing (FIG. 9A). Then, the MS-A 10 performs processing to confirm the authentication information with the Auth 413, 423, 433, 443 (S23).

Next, registration processing in the registration table 4131 within the Auth 413, 423, 433, 443 is explained.

Figure 7:
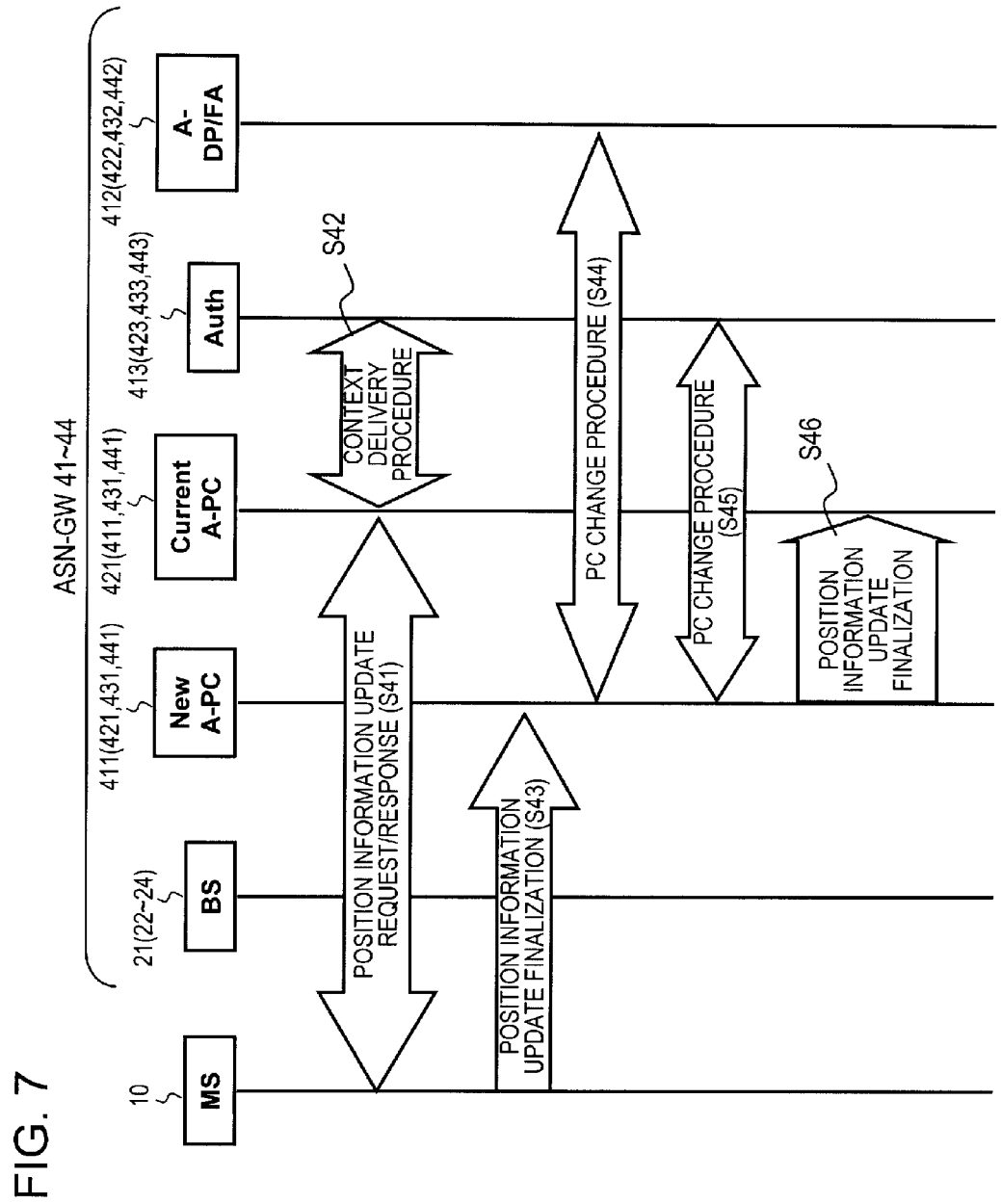
FIG. 7 depicts an example of a sequence of position information update processing.
Figure 8:
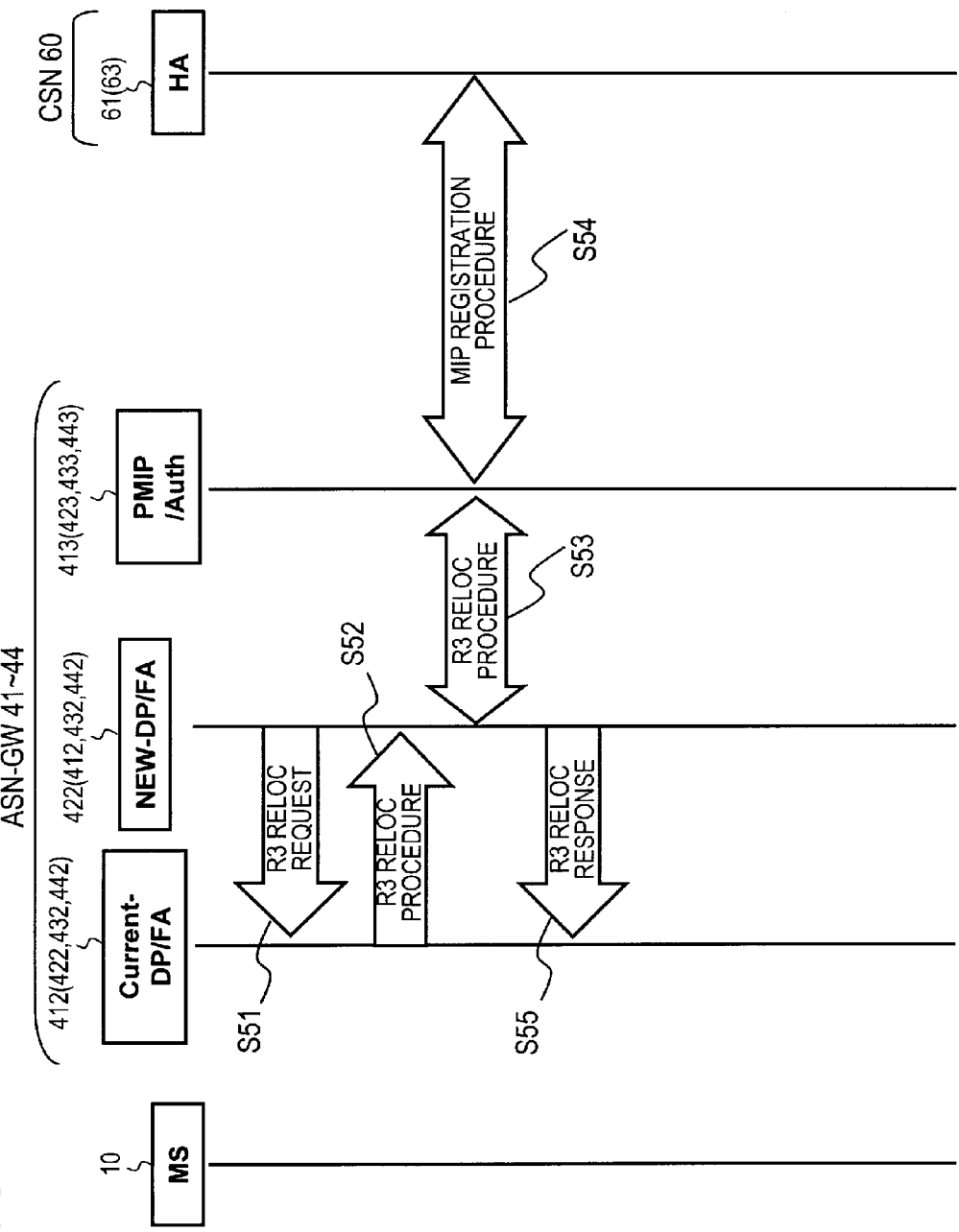
FIG. 8 depicts an example of a sequence of relocation processing.
Figure 9A:
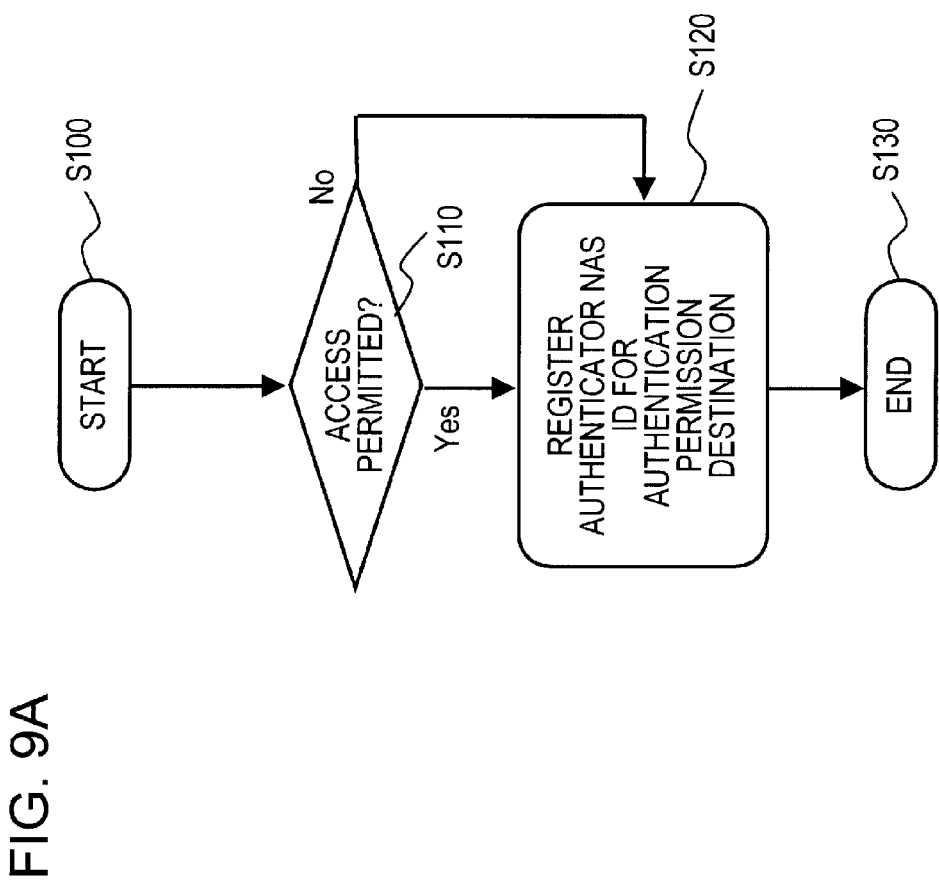

This registration processing is performed at the times of the initial network registration processing (see FIG. 4), transition events of the MS-A 10 from active mode to idle mode (see FIG. 6), position information update (location update) events (see FIG. 7), and relocation events (see FIG. 8). Registration processing in the registration table 4131 during these events is performed because the Auth 413, 423, 433, 443 perform transmission and reception of message with the PC/LR 411, 421, 431, 441 and the DP/FA 412, 422, 432, 442, and even when events occur subsequently to these events, the Auth 413, 423, 433, 443 do not perform transmission and reception of message with the PC/LR 411, 421, 431, 441 or the DP/FA 412, 422, 432, 442, and the PC/LR 411 or similar which manages the MS-A 10 does not change.

Each event is explained as follows. In the initial network registration processing depicted in FIG. 4, after the end of network registration complete processing (S15), the Auth 413, 423, 433, 443 provide a trigger (transmit a data packet, or similar) to the DP/FA 412, 422, 432, 442 to establish a data path (S16). The Auth 413, 423, 433, 443 perform transmission and reception of data with the DP/FA 412, 422, 432, 442, and must register identification information of the DP/FA 412, 422, 432, 442 with which transmission and reception is finally performed, and so processing to register the DP/FA 412, 422, 432, 442 in the registration table 4131 is performed.

FIG. 9B is a flowchart of processing for registration in the registration table 4131, performed by the Auth 413, 423, 433, 443.

First, on the occasion of transmission of the DP establishment trigger (S16), processing is started (S200), and the Auth 413, 423, 433, 443 judge whether the message transmission and reception type is "Context delivery" (S210). "Context delivery" is a transmitted and received massage when data among all the entities 411 or similar of the ASN-GW 41 to 44 is notified to all new entities 411 or similar in the position information update event (FIG. 7) or similar. This "Context delivery" includes information on the PC/LR 411, 421, 431, 441 or DP/FA 412, 422, 432, 442 which is destination of the final transmission and reception. Recording of the content of this message in memory by the Auth 413, 423, 433, 443 includes registration processing in the registration table 4131. For this reason, the Auth 413, 423, 433, 443 judges whether the transmitted and received message type is "Context delivery" or not.

If the transmitted and received message type is not "Context delivery" (No in S210), the Auth 413, 423, 433, 443 judges whether the message transmission and reception destination is the PC/LR 411, 421, 431, 441 or not (S220). This judgment includes not only the message, but an internal trigger as well. The transmitted and received message destination is judged by for example reading transmission and reception destination information, which is contained within the message.

If the transmitted and received message destination is the PC/LR 411, 421, 431, 441 (Yes in S220), the Auth 413, 423, 433, 443 registers identification information of the transmission and reception destination PC/LR 411, 421, 431, 441 in the registration table 4131 (S230). Then, the series of processing ends (S260).

On the other hand, if the transmitted and received message destination is not the PC/LR 411, 421, 431, 441 (No in S220), the Auth 413, 423, 433, 443 judges whether the transmission and reception destination is the DP/FA 412, 422, 432, 442 or not (S240). If the transmission and reception destination is the DP/FA 412, 422, 432, 442 (Yes in S240), the Auth 413, 423, 433, 443 registers identification information of the transmission and reception destination DP/FA 412, 422, 432, 442 in the registration table 4131 (S250). Then, the series of processing ends (S260).

If the transmitted and received message destination is not the DP/FA 412, 422, 432, 442 (No in S240), the Auth 413, 423, 433, 443 ends processing without performing registration (S260).

FIG. 10B depicts an example of the registration table 4131. For each MS, the ID of the final transmission and reception destination PC/LR 411, 421, 431, 441 and DP/FA 412, 422, 432, 442 are registered.

In registration processing in the initial network registration event (FIG. 4), in FIG. 9B, the transmitted and received message type is not "Context delivery" (No in S210), the transmission and reception destination is not the PC/LR 411, 421, 431, 441 (No in S220) but is the DP/FA 412, 422, 432, 442 (Yes in S240), and so the identification information of the DP/FA 412, 422, 432, 442 which is the trigger transmission destination is registered in the registration table 4131.

Figure 6:
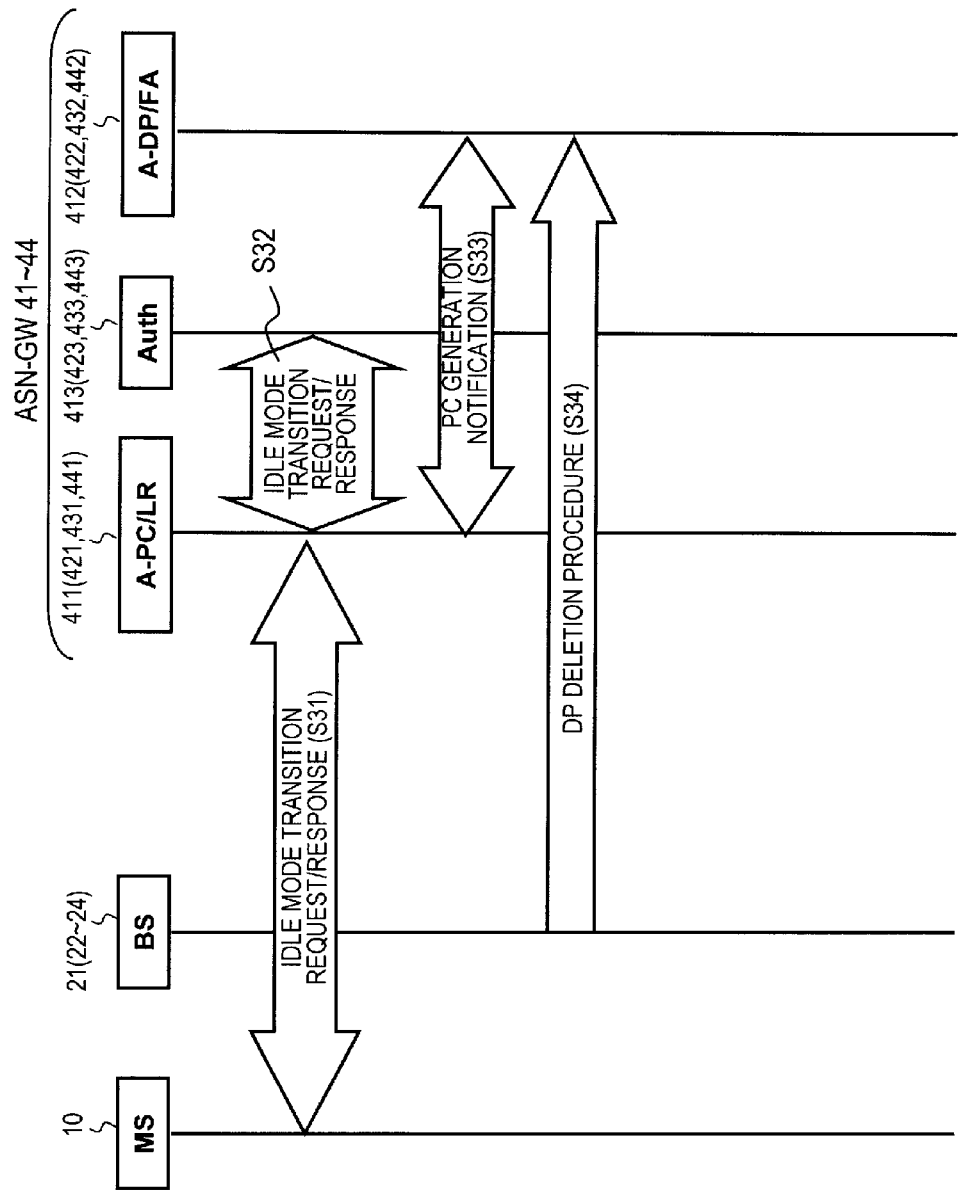
FIG. 6 depicts an example of a sequence of transition processing to idle mode.

Processing for registration in the registration table 4131 (FIG. 9B) is also performed in transition events to idle mode (see FIG. 6). That is, as depicted in FIG. 6, the MS-A 10 transmits and receives message indicating request for transition to idle mode, responses, and similar with one among the PC/LR 411, 421, 431, 441, via the BS 21 to 24 (S31). Then, the PC/LR 411, 421, 431, 441 likewise performs transmission and reception of message indicating transition request to idle mode, response, and similar, with the Auth 413, 423, 433, 443 (S32). The Auth 413, 423, 433, 443 transmits and receives messages with the PC/LR 411, 421, 431, 441, and so performs processing for registration in the registration table 4131 (see FIG. 9B). In this registration processing, because the transmission and reception destination is the PC/LR 411, 421, 431, 441, identification information of the PC/LR 411, 421, 431, 441 is registered in the registration table 4131 (S230).

Processing for registration in the registration table 4131 (FIG. 9B) is also performed during the position information update event (see FIG. 7). The position information update event is an event executed when power to the MS-A 10 is turned off, and there is movement to the cell range of the BS 21 to 24. Because the power to the MS-A 10 is turned off, this event is executed in idle mode (FIG. 2).

As depicted in FIG. 7, the MS-A 10 performs processing for position information update request and other with the PC/LR 411, 421, 431, 441 prior to movement (S41), and the PC/LR 411, 421, 431, 441 performs transmission and reception of the above-described "Context delivery" message with the Auth 413, 423, 433, 443 (S42). The Auth 413, 423, 433, 443 performs message transmission and reception with the PC/LR 411, 421, 431, 441, and so registration processing is performed (FIG. 9B). In registration processing in this case, because the message type is "Context delivery" (Yes in S210), the Auth 413, 423, 433, 443 reads identification information of the PC/LR 411, 421, 431, 441 contained in the "Context delivery" message, and registers the information in the registration table 4131.

Returning to FIG. 7, the MS-A 10 performs position information update final determination processing with the new PC/LR 411, 421, 431, or 441, via the new BS 21 to 24 after the update (S43). Then, the new PC/LR 411, 421, 431, 441 performs PC change procedure processing with the DP/FA 412, 422, 431, 442 in order to provide notification that the PC/LR itself becomes the new PC/LR (S44). And, the new PC/LR 411, 421, 431, 441 performs PC change procedure processing with the Auth 413, 423, 433, 443 if it is necessary to provide notification that the PC/LR itself becomes the new PC/LR (S45).

The necessity of providing notification arises because, even when position information for the MS-A 10 is updated, if the movement distance of the MS-A 10 is short, depending on the communication system 1 it may not be necessary for the PC/LR 411, 421, 431, 441 to provide notification that it itself becomes the new PC/LR. When it is necessary to provide notification, the Auth 413, 423, 433, 443 performs message transmission and reception with the new PC/LR 411, 421, 431, 441 (S45). At this time, the Auth 413, 423, 433, 443 performs processing for registration in the registration table 4131 (S230 in FIG. 9B).

Processing for registration in the registration table 4131 (FIG. 9B) is also performed during the R3 relocation event depicted in FIG. 8. The R3 relocation event is an event performed when there is a change in the physical position of the A-DP/FA (the anchor DP/FA, where the anchor is the entity which is to be a point from outside the network). This event is performed no only in the active state M1 depicted in FIG. 2, but in the idle state M2 as well.

As depicted in FIG. 8, firstly, the new DP/FA after updating 412, 422, 432, 442 issues an R3 relocation request or similar to the DP/FA before updating 412, 422, 432, 442 (S51, S52). The new DP/FA 412, 422, 432, 442 then executes with the Auth 413, 423, 433, 442 an R3 relocation procedure, including notification that the DP/FA 412, 422, 432, 442 itself becomes the new DP/FA (S53). At this time, because message transmission and reception with the DP/FA 412, 422, 432, 442 is performed, the Auth 413, 423, 433, 443 performs processing for registration in the registration table 4131 (S250 in FIG. 9B).

By means of the above, the two tables 631 and 4131 registers identification information of the entity 411 or similar which finally performed transmission and reception of message and similar, that is, which currently manages the MS-A 10.

1.2 Position Search Processing

Figure 11A:
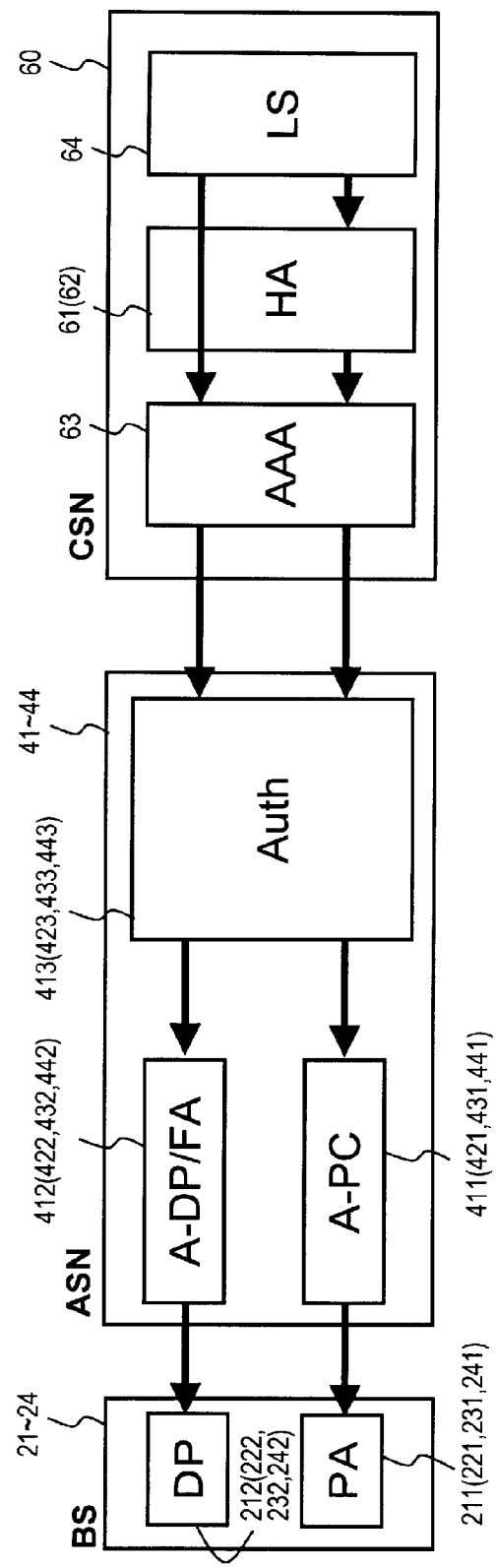
FIG. 11A and FIG. 11B depict examples of the connection configuration of a communication system when performing position search processing.

After registration in the registration tables 631 and 4131, position search processing is executed in the communication system 1. FIG. 11A depicts the connection configuration of the communication system 1 in Embodiment 1. Arrows indicate transmission destination for data and similar. The LS 64 is connected to the Auth 413, 423, 433, 443 via the AAA server 63. The Auth 413, 423, 433, 443 are connected to the DP 212, 222, 232, 242 of the BS 21 to 24 via the A-DP/FA 412, 422, 432, 442, and are connected to the PA 211, 221, 231, 241 via the A-PCs 411, 421, 431, 441.

Operation in the communication system 1 connected in this way is explained. FIG. 12 depicts an example of a sequence of position search processing. Operation is explained referring to FIG. 12. This figure depicts in detail the flow of processing depicted in FIG. 3.

Firstly, the LS 64 outputs to the AAA server 63 a request to finalize position information destination including identification information (for example, the IP address) of the MS-A 10 of the search (or a position search request for the desired MS-A 10) (S500).

Next, the AAA server 63 accesses the registration table 631 and searches for the Auth 413, 423, 433, 443 which finally performed transmission and reception, corresponding to the MS-A 10, from the identification information of the MS-A 10. Then, the AAA server 63 outputs a position information destination final determination request to the Auth 413, 423, 433, 443 obtained in this search (S505). The position information destination final determination request also contains identification information of the MS-A 10.

Next, the Auth 413, 423, 433, 443 accesses the registration table 4131, and reads the PC/LR 411, 421, 431, 441 and the DP/FA 412, 422, 432, 442 which finally performed transmission and reception, corresponding to the MS-A 10, from the identification information of the MS-A 10. Then, the Auth 413, 423, 433, 443 outputs the position information destination final determination request to the PC/LR 411, 421, 431, 441 and DP/FA 412, 422, 432, 442 (S510, S515).

The A-PC/LR 411, 421, 431, 441 outputs to the Auth 413, 423, 433, 443 a position information destination final determination response to the position information destination final determination request (S520). The A-DP/FA 412, 422, 432, 442 also outputs to the Auth 413, 423, 433, 443 the position information destination final determination response to the position information destination final determination request (S525).

The Auth 413, 423, 433, 443 decides, from the position information destination final determination responses, which of the A-PC/LR 411, 421, 431, 441 or the A-DP/FA412, 422, 432, 442 finally performs transmission and reception of the message, among the A-PC/LR 411, 421, 431, 441 or among the A-DP/FA 412, 422, 432, 442, that is, which is currently managing the MS-A 10 (which is currently providing service to the MS-A 10). From the above, this is because the entity 411 or similar finally performed transmission and reception of the message maintains without change the state of the information of the transmission and reception destination entity 411, so long as no special event occurs (FIG. 4), and this entity 411 or similar currently provides service to the MS-A 10.

When for example position information for the MS-A 10 is contained within the position information destination final determination response, the A-PC/LR 411, 421, 431, 441 or A-DP/FA 412, 422, 432, 442 which output the position information destination final determination response containing position information is the entity which truly and finally performed transmission and reception of the message.

This is because, for example, only one of BS 21 to 24 which is currently subordinate the MS-A 10, among the plurality of BS 21 to 24, holds current position information of the MS-A 10; and, the A-PC/LR 411, 421, 431, 441 or A-DP/FA 412, 422, 432, 442 received the position information destination final determination request issues a request to the BS 21 to 24 to obtain information on the current position of the MS-A 10, and only BS 21 to 24 connected to one among the A-PC/LR 411, 421, 431, 441 or A-DP/FA 412, 422, 432, 442 can obtain position information for the MS-A 10.

If time information is contained in the position information destination final determination response, the Auth 413, 423, 433, 443 compares the two position information destination final determination responses, and may identify the entity of the CP/LR 411, 421, 431, 441 or DP/FA 412, 422, 432, 442 finally performed transmission and reception of the message.

Or, the Auth 413, 423, 433, 443 may register time information in advance in the registration table 4131, and at the time of this processing, from the time information, may identify the CP/LR 411, 421, 431, 441 or DP/FA 412, 422, 432, 442 finally performed transmission and reception of the message.

The Auth 413, 423, 433, 443 outputs to the LS 64, via the AAA server 63, the position information destination final determination response including identification information of the A-PC/LR 411, 421, 431, 441 or A-DP/FA 412, 422, 432, 442 finally performed transmission and reception (S530, S535).

And, the LS 64 obtains position information for the MS-A 10, by transmitting the message or similar to the A-PC/LR 411, 421, 431, 441 or A-DP/FA 412, 422, 432, 442, based on the position information destination final determination response. If position information is itself included in the position information destination final determination response, the LS 64 can obtain position information for the MS-A 10, without transmitting the message to obtain position information, by obtaining the position information destination final determination response (S535).

2. Second Embodiment

Next, a second embodiment is explained. This second embodiment is an example in which a position search request (or position information destination final determination request) from the LS 64 is transmitted, via HA 61, 62, to the AAA server 63. The configuration of the communication system 1 is similar to that of the first embodiment.

FIG. 13 depicts the flow of position search processing in this second embodiment. First, the LS 64 outputs the position search request or similar to the HA 61, 62. The position search request or similar includes identification information of the MS-A 10 of the search. The HA 61, 62 reference the registration table 611, obtain identification information of the AAA server 63 which finally performed transmission and reception of the message (or, which currently manages the MS-A 10), and outputs the position search request or similar to this AAA server 63. The subsequent processing is similar to that of the first embodiment. In the communication system 1 depicted in FIG. 1, there is a single AAA server 63, but of course a plurality of AAA servers may be present.

In this second embodiment, compared with a case in which all entities 411 and similar of the ASN-GW 41 to 44 are searched, the PC/LR 411, 421, 431, 441 or DP/FA 412, 422, 432, 442 currently managing (providing service to) the MS-A 10 can be identified through three processes, regardless of the number of ASN-GW 41 to 44. In this communication system 1 also, compared with a case in which all the entities 411 and similar of the ASN-GW 41 to 44 are searched, the entity 411 or similar can be quickly identified, and the current position of the MS-A 10 can be obtained.

Figure 14:
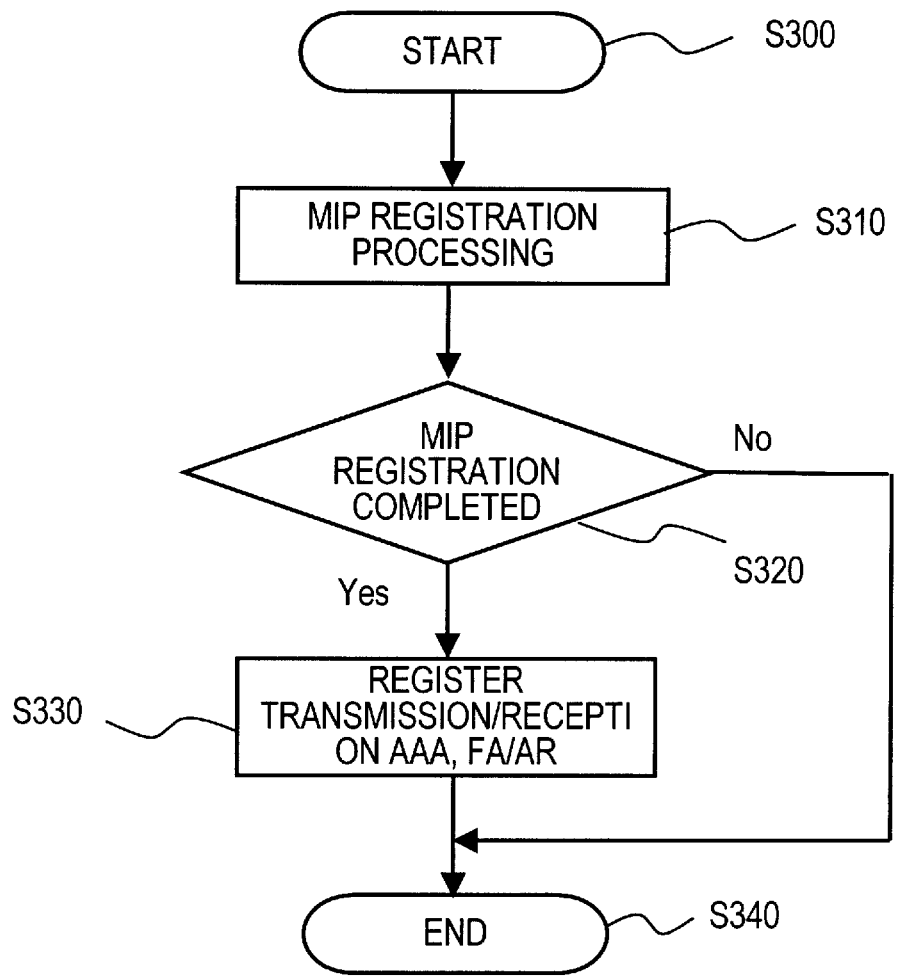
FIG. 14 is a flowchart depicting an example of registration processing.

FIG. 14 is a flowchart of registration processing in the registration table 611 in the HA 61, 62. The timing with which this registration processing is executed is the timing with which MIP registration processing (S19) of the initial network registration event depicted in FIG. 4 is executed. That is, in IP registration processing of the MS-A 10 (MIP registration processing S19), the HA 61, 62 performs a confirmation request as to whether the MS-A can be registered or not to the AAA server 63, and the AAA server 63 returns a response to the HA 61, 62. The HA 61, 62 performs transmission and reception of the message with the AAA server 63, and subsequently so long as this initial network registration processing event is not performed, the HA 61, 62 does not perform transmission and reception of the message with the AAA server 63, and so the AAA server 63 registered in this processing is the AAA server 63 which finally performed transmission and reception of the message.

The registration processing of FIG. 14 is explained. First, if this registration processing is started (S300), the HA 61, 62 performs MIP registration processing (S310). MIP registration processing is MIP registration processing of initial network registration processing (S19; see FIG. 4).

Next, the HA 61, 62 judges whether the registration of MIP is completed or not (S320). For example, a judgment is made as to whether a response indicating registration completion has been returned from the AAA server 63 in response to the above-described registration confirmation request of the HA 61, 62.

If MIP registration is completed (Yes in S320), the HA 61, 62 registers identification information of the transmission and reception destination AAA server 63 (for example, the IP address of the AAA server 63) in the registration table 611 (S330). Then, the series of processing ends (S340).

On the other hand, when MIP registration does not completed (S320), the HA 61, 62 ends the series of processing without performing registration in the registration table 611 (S340).

Figure 15:
FIG. 15 depicts an example of a registration table.

FIG. 15 depicts an example of the registration table 611. The IP addresses of AAA servers 63 are registered together with MS ID and IP address.

After registration processing of the HA 61, 62 ended, the communication system 1 performs position search processing. Of course, registration processing in other registration tables 631, 4131 (FIG. 9A and FIG. 9B) is also completed.

FIG. 12 depicts an example of a sequence of position search processing in this second embodiment. The LS 64 outputs the position information destination final determination request (or the position search request) to the HA 61, 62 (S600).

The HA 61, 62 reads, from the registration table 611, the AAA server 63 which finally performed transmission and reception of the message (which is currently providing service to the MS-A 10), and outputs the position information destination final determination request to this AAA server 63 (S605).

Processing from the position information destination final determination request (S505) to the position information destination final determination response (S530) is the same as in the first embodiment, and so an explanation is omitted. Similarly to the first embodiment, the ID of the MS-A 10 of the search is included in the position information destination final determination request.

Upon receiving the position information destination final determination response, the AAA server 63 outputs the position information destination final determination response to the HA 61, 62, and the HA 61, 62 outputs this position information destination final determination response to the LS 64 (S610, S615).

If position information (latitude, longitude, altitude, or similar) for the MS-A 10 is included in the position information destination final determination response, the LS 64 ends the search by receiving the position information destination final determination response. If the entity 411 or similar currently managing the MS-A 10 is included in the position information destination final determination response, the position information of the MS-A 10 is obtained by outputting the message to this entity 411 or similar.

In this second embodiment, the search path is from the LS 64 toward the AAA server 63 via the HA 61, 62. In addition to the path directly from the LS 64 to the AAA server 63 as in the first embodiment, the path such as that of the second embodiment may also be used.

3. Third Embodiment

Figure 11B:
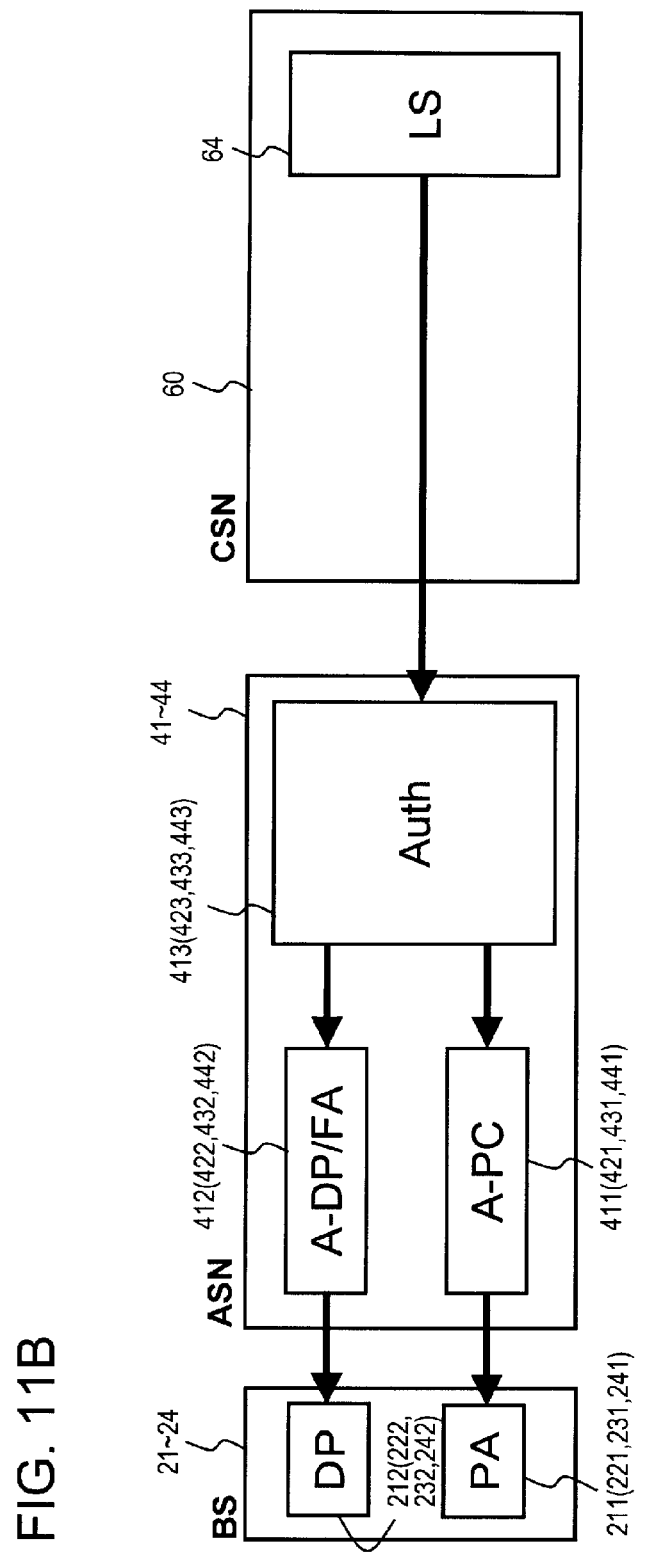
Figure 16:
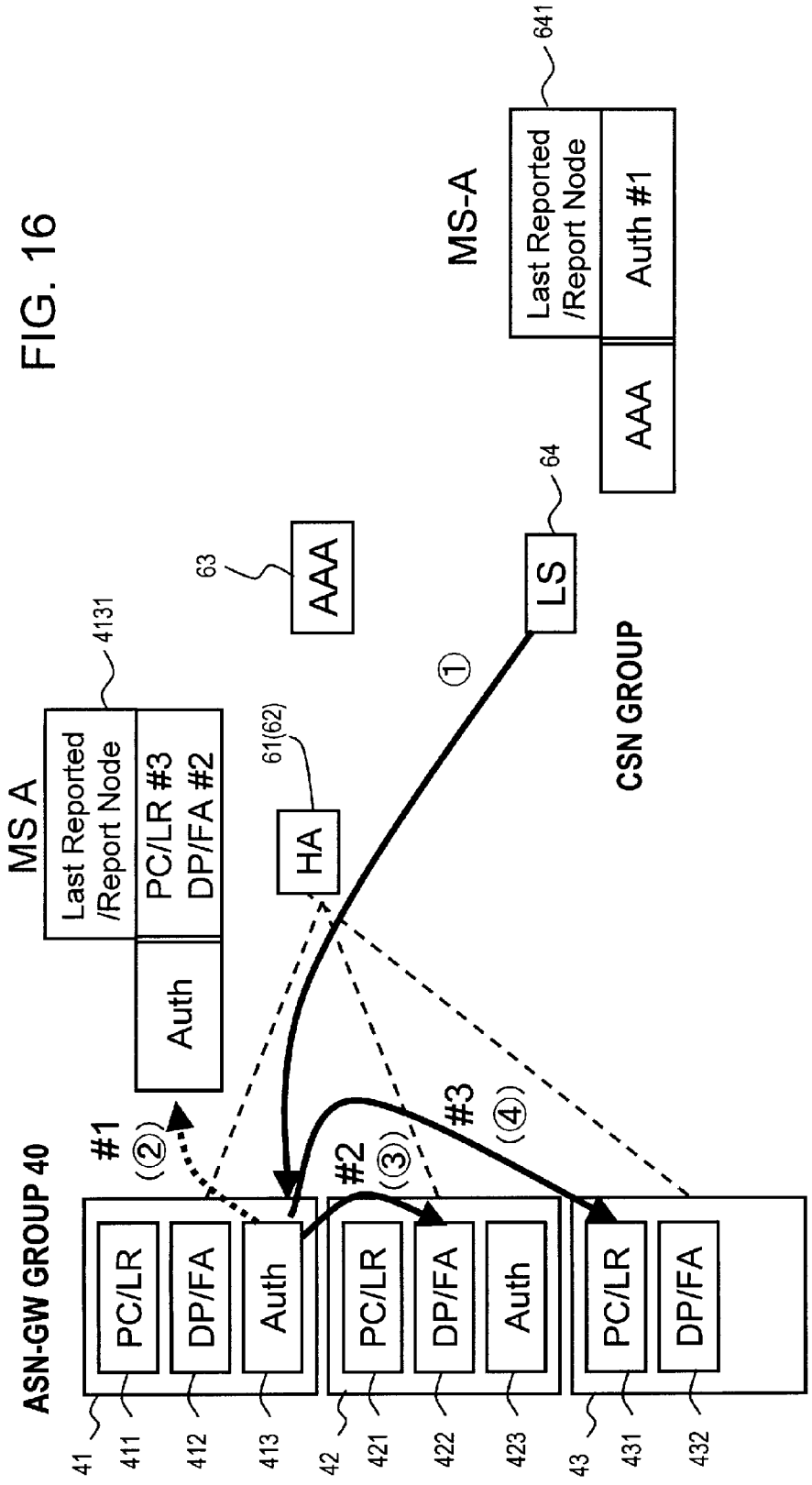
FIG. 16 depicts the flow of processing when performing position searching.

Next, a third embodiment is explained. The third embodiment is an example in which, in position search processing, the LS 64 outputs the position information destination final determination request (or position search request) directly to the Auth 413, 423, 433, 443. FIG. 11B depicts the configuration if performing position searching, and FIG. 16 depicts the flow of processing when performing position searching.

Similarly to the first and second embodiments, compared with the case in which all the entities 411 and similar of the ASN-GW 41 to 44 are searched, the entity 411 or similar currently managing the MS-A 10 can quickly be retrieved. Moreover, search processing by the AAA server 63 can be eliminated, so that compared with the first and second embodiment, the search time can be further shortened. By shortening the search time, resource of the communication system 1 can be utilized effectively.

In order for the LS 64 to output the position information destination final determination request to the Auth 413, 423, 433, 443, the LS 64 must hold information registered in the registration table 631 of the AAA server 63. For this purpose, the LS 64 must obtain ID from the Auth 413, 423, 433, 443.

Figure 17:
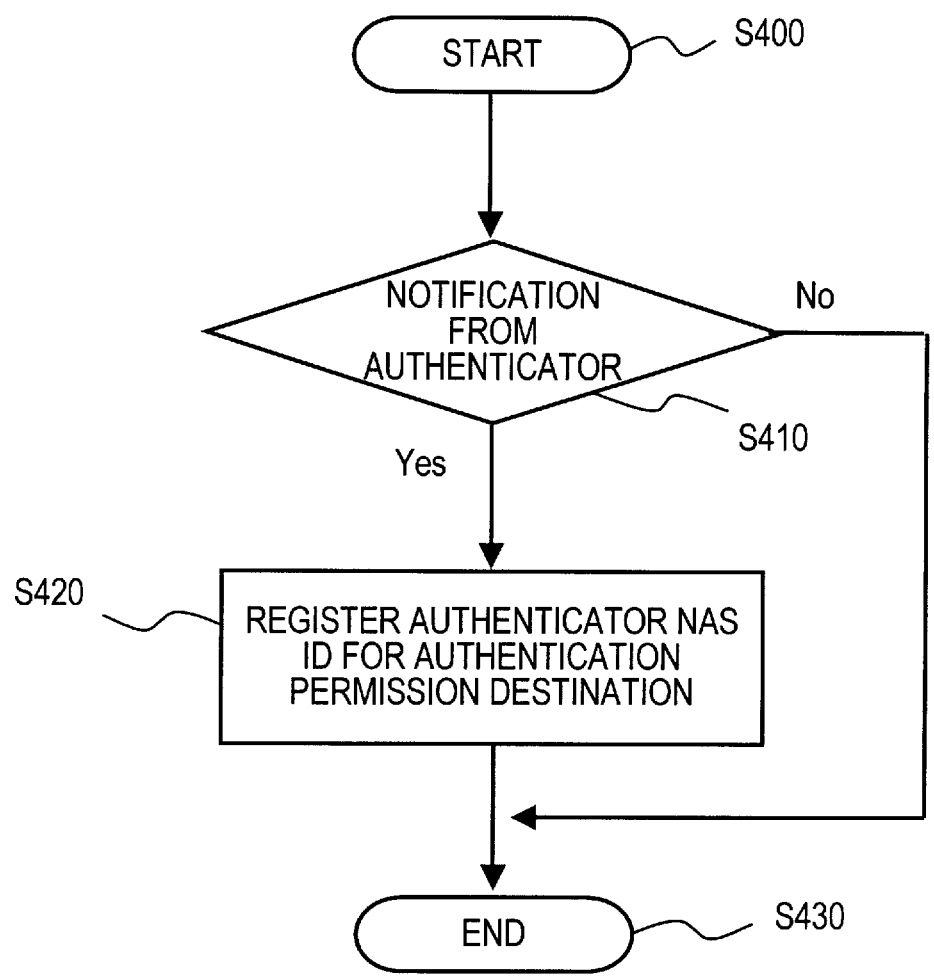
FIG. 17 is a flowchart depicting an example of registration processing.

FIG. 17 depicts a flowchart of processing for registration in a registration table 641 in the LS 64. The timing with which this registration processing is executed is within the events of the initial network registration and re-authentication. Similarly to the first embodiment, the Auth 413, 423, 433, 443, after authentication and re-authentication is performed, remain in a state in which connection with the MS-A 10 is held, so long as there is no event such as initial network registration or similar; and if the LS 64 can obtain from the Auth 413, 423, 433, 443 identification information of the Auth 413, 423, 433, 443 currently managing the MS-A 10, then the same information as the registration table 631 held by the AAA server 63 can be held.

That is, as depicted in FIG. 4, after completion of registration of the MS-A 10 with the network (S15), one of the Auth 413, 423, 433, 443 outputs a notification message including the ID of the Auth 413, 423, 433, 443 to the LS 64. At this time, the LS 64 performs registration processing in the registration table 641.

As depicted in FIG. 17, the LS 64 judges whether there is notification from the Auth 413, 423, 433, 443 or not (S410), and if there is notification (Yes in S410), the LS 64 extracts the ID of the Auth 413, 423, 433, 443 permitting authentication (the transmission destination of the transmitted notification) from the notification, and registers the ID in the registration table 641 (S420). Then, the series of processing ends (S430).

On the other hand, if there is no notification (No in S410), the LS 64 ends the series of processing (S430).

This registration processing is also performed during re-authentication events (FIG. 5). That is, when processing to confirm authentication information (S23) is performed between the MS-A 10 and the Auth 413, 423, 433, 443, the Auth 413, 423, 433, 443 outputs the notification message to the LS 64. Similarly to initial network registration events, the LS 64 may execute registration processing (FIG. 17) with this timing.

Figure 18:
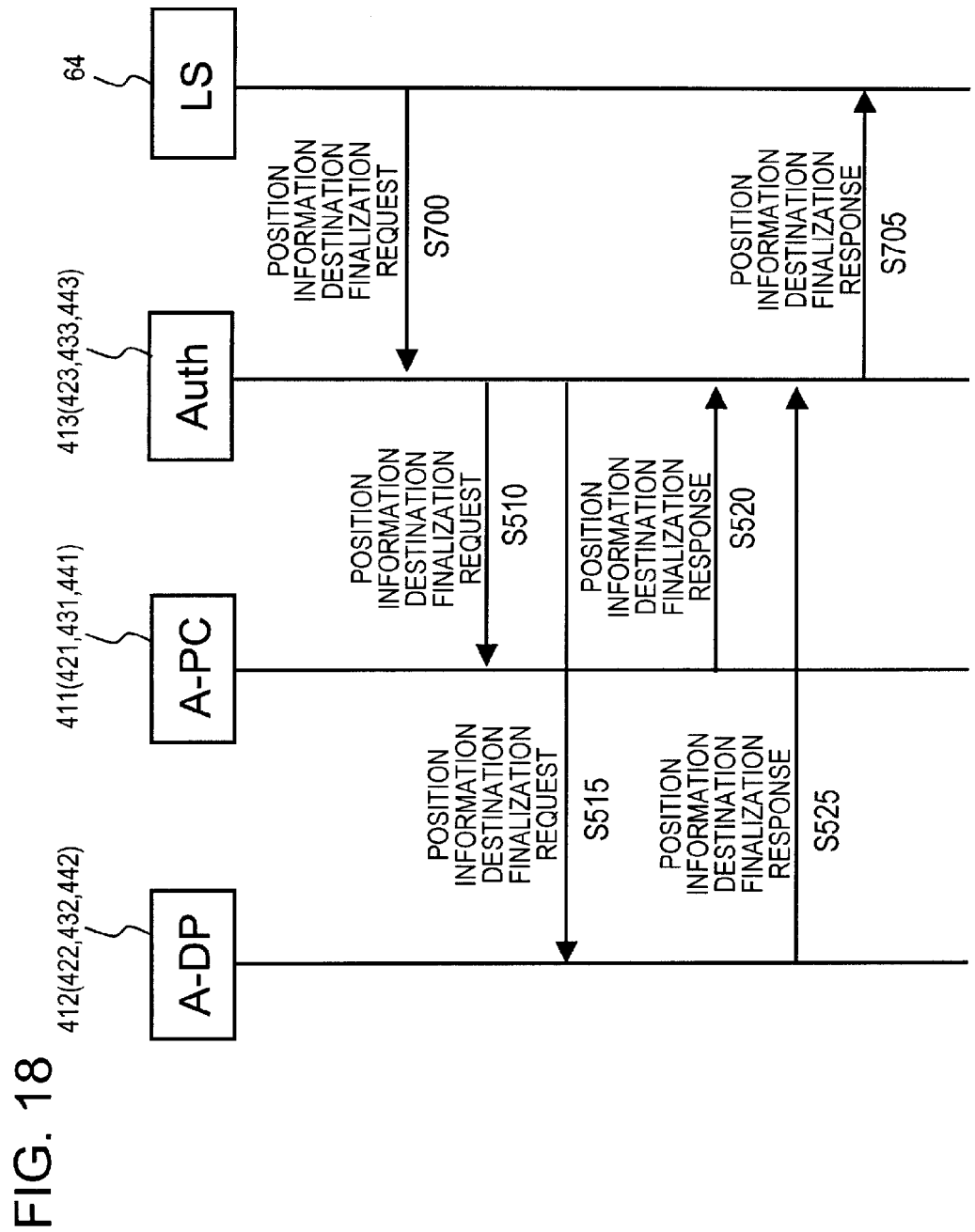
FIG. 18 depicts an example of a sequence of position search processing.

FIG. 18 depicts an example of the sequence of position search processing after registration. As depicted in the figure, the LS 64 searches the registration table 641 and outputs the position information destination final determination request to the Auth 413, 423, 433, 443 currently managing the MS-A 10 (S700). As a response to this position information destination final determination request, the LS 64 receives the position information destination final determination response from the Auth 413, 423, 433, 443. Other processing, as well as specific examples of the position information destination final determination request and information destination final determination response, are the same as in the first embodiment, and so explanations are omitted.

4. Other Embodiments

In the above-described first to third embodiments, each of the entities of the ASN-GW 41 to 44 is explained as a functional block. These blocks can be realized by a computer 70 (a personal computer, workstation, or similar) depicted in FIG. 19. That is, a program stored in a ROM 72 is read and executed by a CPU 71, or other cooperative operation by the CPU 71, the ROM 72, and a RAM 73, is performed to realize the functions of these entities. For example, each ASN-GW 41 to 44 may be one computer 70 depicted in FIG. 19. Or, each entity 411 may be one computer 70.

Figure 19:
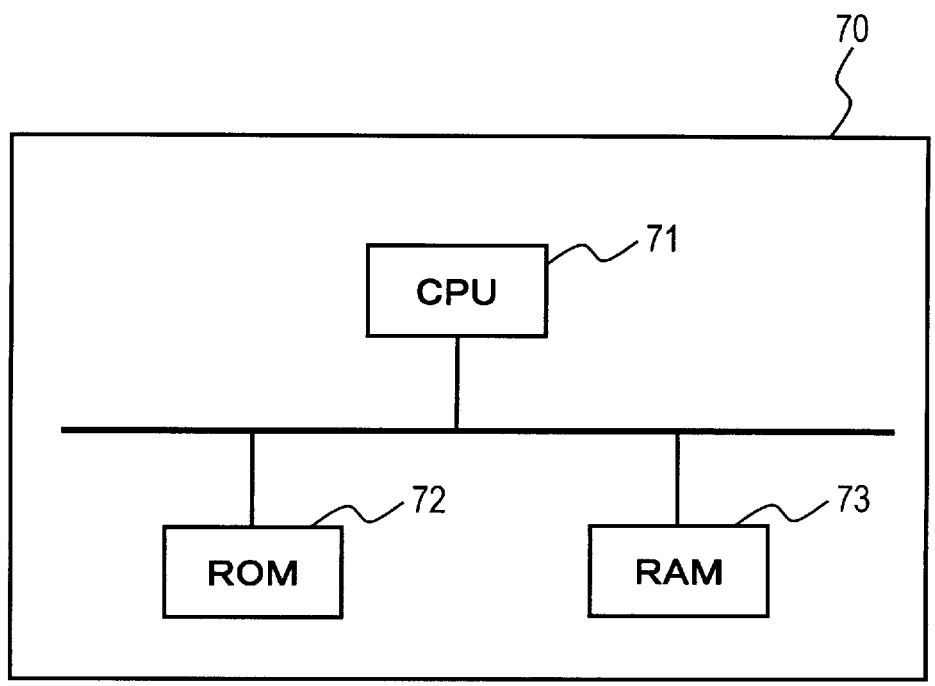
FIG. 19 depicts an example of the configuration of a computer.

Further, the AAA server 63 and LS 64 constructed by the CSN group 60 can also be realized by computer 70 depicted in FIG. 19. The BS 21 to 24 can similarly be realized, and the PA 211, 221, 231, 241 and DP 212, 222, 232, 242 can also be realized through cooperative operation of the CPU 71, ROM 72, and RAM 73.

In the above-described first to third embodiments, explanations are given assuming registration in the registration table 4131 of two types of devices, which are PC/LR 411, 421, 431, 441, and DP/FA 412, 422, 432, 442. Of course, only one of these two types may be registered in the registration table 4131. In this case, the registration processing depicted in FIG. 9B can be performed by registration such that one of the identification information items is overwritten in the registration table 4131 in S230 and S250. In essence, in position search processing (FIG. 12 and similar), the Auth 413, 423, 433, 443 need only identify identification information for the PC/LR 411, 421, 431, 441 or the DP/FA 412, 422, 432, 442 which finally performed transmission and reception (that is, the PC/LR 411, 421, 431, 441 or the DP/FA 412, 422, 432, 442 which currently manages the MS-A 10).

In the above-described first to third embodiments, explanations are given in which the number of BS 21 to 24 comprised by the BS group 20 is four, and the number of ASN-GW 41 to 44 constructed by the ASN-GW group 40 is also four. Of course, this is but one example, and the number of BS and ASN-GW may be one, or may be five or more. Also, the number of HA 61, 62 constructed by the CSN group 60 may be one, or may be three or more. There may also be two or more AAA servers 63 and LS 64.

The invention claimed is:

1. A communication system comprising:
   a base station device that performs wireless communication with a mobile terminal;
   a gateway device that is connected to the base station device and provides the mobile terminal via the base station device with a connection path to a network, and including
      a data path unit that selects input data and transmits the data to the mobile terminal,
      a paging controller unit that manages information of the mobile terminal in a state in which power supply of the mobile terminal is turned off, and
      an authentication unit that transmits the authentication key issued by the authentication server to the mobile terminal, and includes a second registration table which registers identification information of the data path unit or the paging controller unit finally performed data transmission and reception,
      wherein either the data path unit or the paging controller unit operates according to the state of the mobile terminal;
   an authentication server that is connected to the gateway device and issues an authentication key to the mobile terminal via the gateway device and the base station device, and including a first registration table which registers identification information of the authentication unit finally performed data transmission and reception; and
   a position search server which outputs a request requesting determination of position of the mobile terminal;
   wherein,
   the authentication server identifies the authentication unit from the first registration table, and outputs the request to the identified authentication unit, if the authentication server receives the request from the position search server,
   the authentication unit identifies the data path unit or the paging controller unit from the second registration table, if the authentication unit receives the request from the authentication server, and
   the position search server obtains position information of the mobile terminal from the identified data path unit or paging controller unit.

2. The communication system according to claim 1, wherein the authentication server performs registration in the first registration table, if the authentication server transmits an access permission message permitting the mobile terminal to access a network.

3. The communication system according to claim 1, wherein the authentication server performs registration in the first registration table, in case of an initial network registration event in which the mobile terminal performs network registration processing with the base station device, the gateway device, and the authentication server, or in case of a re-authentication event in which the authentication server performs re-authentication of the mobile terminal at fixed intervals.

4. The communication system according to claim 1, wherein the authentication unit performs registration in the second registration table if data transmission and reception is performed between the data path unit and the paging controller unit.

5. The communication system according to claim 1, wherein the authentication unit performs registration in the second registration table, in case of an initial network registration event in which the mobile terminal performs network registration with the base station device, the gateway device, and the authentication server, in case of an idle mode transition event in which the mobile terminal performs transition to idle mode that the power supply of the mobile terminal is turned off, in case of a position information update event in which position information of the mobile terminal is updated, and in case of a relocation event in which position of the data path unit is updated due to movement.

6. The communication system according to claim 1, wherein
   the first and second registration tables register identification information of the authentication unit, the data path unit, and the paging controller unit, for each the mobile terminal,
   the request includes identification information of the mobile terminal, and
   the authentication server and the authentication unit search the first and second registration tables based on identification information of the mobile terminal included in the request.

7. The communication system according to claim 1, wherein
   the second registration table registers both identification information of the data path unit and the paging controller unit finally performed data transmission and reception, and
   the authentication unit identifies the data path unit and the paging controller unit from the second registration table, outputs the request to the data path unit and to the paging controller unit, and identifies the data path unit or the paging controller unit managing the mobile terminal based on determination response to the request from the data path unit and the paging controller unit, if the authentication unit receives the request from the authentication server.

8. The communication system according to claim 7, wherein
   the base station device holds position information of the mobile terminal;
   the data path unit and the paging controller unit, in response to the request, request acquisition of the position information from the base station device connected to the data path unit and the paging controller unit;

only the data path unit or the paging controller unit acquired the position information inserts the position information into the determination response and outputs to the authentication unit; and the authentication unit identifies the data path unit or the paging controller unit output the determination response including the position information, as the data path unit or the paging controller unit managing the mobile terminal.

9. The communication system according to claim 7, wherein the determination response includes time information, and the authentication unit identifies the data path unit or the paging controller unit managing the mobile terminal, by comparing the time information included in the determination response.

10. A communication system comprising:

a base station device that performs wireless communication with a mobile terminal;

a gateway device that is connected to the base station device and provides the mobile terminal via the base station device with a path of connection to a network, and including:

a data path unit that selects input data and transmits the data to the mobile terminal, a paging controller unit that manages information of the mobile terminal in a state in which power supply of the mobile terminal is turned off, and an authentication unit that transmits the authentication key issued by the authentication server to the mobile terminal, and includes a second registration table which registers identification information of each of the data path unit and the paging controller unit finally performed data transmission and reception, wherein either the data path unit or the paging controller unit operates according to the state of the mobile terminal;

an authentication server that is connected to the gateway device and issues an authentication key to the mobile terminal via the gateway device and the base station device, and including a first registration table which registers identification information of the authentication unit finally performed data transmission and reception;

a position search server which outputs a request requesting determination of position of the mobile terminal; and a home agent which delivers data to the mobile terminal; wherein the home agent further comprising a third registration table which registers identification information of the authentication server finally performed data transmission and reception, the home agent identifies the authentication server from the third registration table, and outputs the request to the identified authentication server, if the home agent receives the request from the position search server, the authentication server identifies the authentication unit from the first registration table, and outputs the request to the identified authentication unit, if the authentication server receives the request from the home agent, the authentication unit identifies the data path unit or the paging controller unit from the second registration table, if the authentication unit receives the request from the authentication server, and the position search server obtains position information of the mobile terminal from the identified data path unit or paging controller unit.

11. A communication system comprising:

a base station device that performs wireless communication with a mobile terminal;

a gateway device that is connected to the base station device and provides the mobile terminal via the base station device with a path of connection to a network, and including:

a data path unit that selects input data and transmits the data to the mobile terminal, a paging controller unit that manages information of the mobile terminal in a state in which the power supply of the mobile terminal is turned off, and an authentication unit that transmits the authentication key issued by the authentication server to the mobile terminal, and includes a second registration table which registers identification information of each of the data path unit and the paging controller unit finally performed data transmission and reception, wherein either the data path unit or the paging controller unit operates according to the state of the mobile terminal;

an authentication server that is connected to the gateway device and issues an authentication key to the mobile terminal via the gateway device and the base station device; and a position search server which outputs a request requesting determination of position of the mobile terminal;

wherein the position search server further comprising a fourth registration table which registers identification information of the authentication unit finally performed data transmission and reception, the position search server outputs the request to the authentication unit registered in the fourth registration table, the authentication unit identifies the data path unit or the paging controller unit from the second registration table, if the authentication unit receives the request from the position search server, and the position search server obtains position information of the mobile terminal from the identified data path unit or the paging controller unit.

12. A mobile terminal position search method in a communication system which includes: a base station device that performs wireless communication with a mobile terminal; a gateway device that is connected to the base station device and provides the mobile terminal via the base station device with a path of connection to a network; and an authentication server that is connected to the gateway device and issues an authentication key to the mobile terminal via the gateway device and the base station device, in which the gateway device includes: a data path unit that selects input data and transmits the data to the mobile terminal; a paging controller unit that manages information of the mobile terminal in a state in which the power supply of the mobile terminal is turned off; and an authentication unit that transmits the authentication key issued by the authentication server to the mobile terminal, and in which either the data path unit or the paging controller unit operates according to the state of the mobile terminal, the method comprising:

outputting a request requesting determination of position of the mobile terminal by a position search server;

receiving the request from the position search server, identifying the authentication unit from a first registration table which registers identification information of the authentication unit finally performed data transmission and reception, and outputting the request to the identified authentication unit, by the authentication server;

receiving the request from the authentication server, and identifying the data path unit and the paging controller unit from a second registration table which registers identification of the data path unit or the paging controller unit finally performed data transmission and reception, by the authentication unit; and obtaining position information of the mobile terminal from the identified data path unit or paging controller unit, by the position search server.

13. A mobile terminal position search method in a communication system which includes: a base station device that performs wireless communication with a mobile terminal; a gateway device that is connected to the base station device and provides the mobile terminal via the base station device with a path of connection to a network; and an authentication server that is connected to the gateway device and issues an authentication key to the mobile terminal via the gateway device and the base station device, in which the gateway device includes: a data path unit that selects input data and transmits the data to the mobile terminal; a paging controller unit that manages information of the mobile terminal in a state in which the power supply of the mobile terminal is turned off; and an authentication unit that transmits the authentication key issued by the authentication server to the mobile terminal, and in which either the data path unit or the paging controller unit operates according to the state of the mobile terminal, the method comprising:

outputting a request requesting determination of the position of the mobile terminal to a home agent which delivers data to the mobile terminal, by a position search server;

receiving the request, identifying the authentication server from a third registration table which registers identification information of the authentication server finally performed data transmission and reception, and outputting the request to the identified authentication server, by the home agent;

receiving the request, identifying the authentication unit from a first registration table which registers identification information of the authentication unit finally performed data transmission and reception, by the authentication server;

receiving the request, and identifying the data path unit or the paging controller from a second registration table which registers identification information of the data path unit or the paging controller finally performed data transmission and reception, by the authentication unit; and obtaining position information of the mobile terminal from the identified data path unit or paging controller unit, by the position search server.

14. A mobile terminal position search method in a communication system which includes: a base station device that performs wireless communication with a mobile terminal; a gateway device that is connected to the base station device and provides the mobile terminal via the base station device with a path of connection to a network; and an authentication server that is connected to the gateway device and issues an authentication key to the mobile terminal via the gateway device and the base station device, in which the gateway device includes: a data path unit that selects input data and transmits the data to the mobile terminal; a paging controller unit that manages information of the mobile terminal in a state in which the power supply of the mobile terminal is turned off; and an authentication unit that transmits the authentication key issued by the authentication server to the mobile terminal, and in which either the data path unit or the paging controller unit operates according to the state of the mobile terminal, the method comprising:

outputting a request requesting determination of position of the mobile terminal, by a position search server;

receiving the request from the position search server, and identifying the data path unit or the paging controller unit from a second registration table which registers identification information of the data path unit or the paging controller unit finally performed data transmission and reception, by the authentication unit; and obtaining position information of the mobile terminal from the identified data path unit or paging controller unit, by the position search server.

15. A program being executed by a computer in a communication system which includes: a base station device that performs wireless communication with a mobile terminal; a gateway device that is connected to the base station device and provides the mobile terminal via the base station device with a path of connection to a network; and an authentication server that is connected to the gateway device and issues an authentication key to the mobile terminal via the gateway device and the base station device, in which the gateway device includes: a data path unit that selects input data and transmits the data to the mobile terminal; a paging controller unit that manages information of the mobile terminal in a state in which the power supply of the mobile terminal is turned off; and an authentication unit that transmits the authentication key issued by the authentication server to the mobile terminal, and in which either the data path unit or the paging controller unit operates according to the state of the mobile terminal, the program cause to the computer to execute:

processing to cause a position search server to output a request requesting determination of position of the mobile terminal;

processing to cause the authentication server to receive the request from the position search server, to identify the authentication unit from a first registration table which registers identification information of the authentication unit finally performed data transmission and reception, and to output the request to the identified authentication unit;

processing to cause the authentication unit to receive the request from the authentication server, and to identify the data path unit or the paging controller unit from a second registration table which registers identification information of the data path unit or the paging controller unit finally performed data transmission and reception; and processing to cause the position search server to obtain position information of the mobile terminal from the identified data path unit or paging controller unit.

* * * * *